US012760175B2

(12) United States Patent
Grinsteinner

(10) Patent No.: US 12,760,175 B2
(45) **Date of Patent: *Oct. 13, 2026**

(54) POLYOXYMETHYLENE POLYMER COMPOSITION FOR ROTATIONAL MOLDING APPLICATIONS

(71) Applicant: Celanese International Corporation, Irving, TX (US)

(72) Inventor: Darin Grinsteinner, Fort Mitchell, KY (US)

(73) Assignee: Celanese International Corporation, Irving, TX (US)

( * ) Notice: Subject to any disclaimer, the term of this patent is extended or adjusted under 35 U.S.C. 154(b) by 616 days.

This patent is subject to a terminal disclaimer.

(21) Appl. No.: 17/721,682

(22) Filed: Apr. 15, 2022

(65) Prior Publication Data

US 2022/0356341 A1 Nov. 10, 2022

Related U.S. Application Data

(60) Provisional application No. 63/296,578, filed on Jan. 5, 2022, provisional application No. 63/240,503, filed (Continued)

(51) Int. Cl.

*C08L 59/02* (2006.01)
*B65D 1/18* (2006.01)
*B65D 25/42* (2006.01)

(52) U.S. Cl.

CPC ................ *C08L 59/02* (2013.01); *B65D 1/18* (2013.01); *B65D 25/42* (2013.01);

(Continued)

(58) Field of Classification Search

CPC ............... C08L 59/02; C08L 2205/025; C08L 2205/035; C08L 2207/04; B65D 1/18; B65D 25/42

See application file for complete search history.

(56) References Cited

U.S. PATENT DOCUMENTS

| | | | |
|---|---|---|---|
| 6,271,302 | B1 | 8/2001 | Matsushima |
| 6,433,106 | B1 | 8/2002 | Mori et al. |

(Continued)

FOREIGN PATENT DOCUMENTS

| | | | |
|---|---|---|---|
| CN | 202357856 | U | 8/2012 |
| CN | 103522512 | A | 1/2014 |

(Continued)

OTHER PUBLICATIONS

Pielichowski et al. Structure-Property Relationships in Polyoxymethylene/Thermoplastic Polyurethane Elastomer Blends. Journal of Polymer Engineering. vol. 25, No. 4, 2005. (Year: 2005).*

(Continued)

*Primary Examiner* — John E Uselding
(74) *Attorney, Agent, or Firm* — Dority & Manning, P.A.

(57) ABSTRACT

A polymer composition containing a polyoxymethylene polymer in the form of particles for rotational molding applications is disclosed. The polyoxymethylene polymer is selected to have physical characteristics and is combined with one or more impact modifiers in order to produce hollow vessels and other articles having improved physical properties, such as impact strength resistance.

13 Claims, 3 Drawing Sheets

Related U.S. Application Data on Sep. 3, 2021, provisional application No. 63/175,783, filed on Apr. 16, 2021.

(52) U.S. Cl.
CPC ... *C08L 2205/025* (2013.01); *C08L 2205/035* (2013.01); *C08L 2207/04* (2013.01)

(56) References Cited

U.S. PATENT DOCUMENTS

| | | | |
|---|---|---|---|
| 6,512,047 | B2 | 1/2003 | Kim et al. |
| 6,936,651 | B2 | 8/2005 | Flexman et al. |
| 6,943,214 | B2 | 9/2005 | Flexman |
| 7,041,718 | B2 | 5/2006 | Harashina et al. |
| 7,163,522 | B1 * | 1/2007 | Wang .................... A61L 29/085 604/524 |
| 7,557,162 | B2 | 7/2009 | Patel et al. |
| 7,829,610 | B2 | 11/2010 | Papke |
| 8,008,390 | B2 | 8/2011 | Günnewig et al. |
| 8,128,845 | B2 | 3/2012 | Moraczewski et al. |
| 8,329,829 | B2 | 12/2012 | Serhatkulu |
| 8,840,976 | B2 | 9/2014 | Larson et al. |
| 8,865,053 | B2 | 10/2014 | Monsheimer et al. |
| 9,249,279 | B2 | 2/2016 | Shimoda |
| 9,562,155 | B2 | 2/2017 | Matsuoka |
| 9,574,082 | B2 | 2/2017 | Matsuoka |
| 9,593,200 | B2 | 3/2017 | Tanaka |
| 9,745,467 | B2 | 8/2017 | Mulholland et al. |
| 9,803,061 | B2 | 10/2017 | Hattori et al. |
| 10,072,147 | B2 | 9/2018 | Shimoda et al. |
| 10,131,782 | B2 | 11/2018 | Nandi et al. |
| 10,301,449 | B2 | 5/2019 | Hong et al. |
| 10,815,371 | B2 | 10/2020 | Hirooka et al. |
| 10,844,191 | B2 | 11/2020 | Arai et al. |
| 2003/0148117 | A1 | 8/2003 | Takada et al. |
| 2004/0118509 | A1 | 6/2004 | Flexman et al. |
| 2004/0121175 | A1 | 6/2004 | Flexman et al. |
| 2005/0020770 | A1 | 1/2005 | Kim et al. |
| 2005/0043492 | A1 | 2/2005 | Chin et al. |
| 2005/0131124 | A1 | 6/2005 | Philippoz et al. |
| 2006/0151505 | A1 | 7/2006 | Kobayashi |
| 2007/0066746 | A1 | 3/2007 | Gunnewig et al. |
| 2007/0073007 | A1 | 3/2007 | Harashina |
| 2009/0220719 | A1 | 9/2009 | Klug et al. |
| 2011/0086952 | A1 | 4/2011 | Bessho et al. |
| 2011/0245422 | A1 | 10/2011 | Disson et al. |
| 2011/0313086 | A1 | 12/2011 | Sharavanan et al. |
| 2012/0091013 | A1 * | 4/2012 | Larson ................ B29C 49/0005 156/245 |
| 2013/0082064 | A1 | 4/2013 | Larson et al. |
| 2013/0323451 | A1 * | 12/2013 | Junger ............... C08G 18/0895 524/169 |
| 2016/0177219 | A1 | 6/2016 | Markgraf et al. |
| 2018/0030219 | A1 | 2/2018 | Chung et al. |
| 2019/0010299 | A1 | 1/2019 | Markgraf et al. |
| 2019/0367703 | A1 | 12/2019 | Zia et al. |
| 2020/0247009 | A1 | 8/2020 | Chung et al. |
| 2021/0095112 | A1 | 4/2021 | Arai et al. |

FOREIGN PATENT DOCUMENTS

| | | | |
|---|---|---|---|
| CN | 104177551 | B | 9/2016 |
| CN | 107459760 | B | 9/2019 |
| DE | 102005044515 | A1 | 5/2007 |
| DE | 102006050101 | B4 | 2/2021 |
| EP | 0277630 | A1 | 8/1988 |
| EP | 0733667 | A1 | 9/1996 |
| EP | 2371901 | B1 | 9/2013 |
| JP | WO2002024807 | A1 | 1/2004 |
| JP | 2001011143 | A | 1/2011 |
| JP | 5281239 | B2 | 9/2013 |
| JP | 2017520673 | A | 7/2017 |
| KR | 101470916 | B1 | 12/2014 |
| WO | WO02/014429 | A | 2/2002 |
| WO | WO03/050187 | A1 | 6/2003 |
| WO | WO2011111823 | A1 | 9/2011 |
| WO | WO2020013184 | A1 | 1/2020 |

OTHER PUBLICATIONS

English machine translation of DE 102005044515 A1. (Year: 2007).*
International Search Report Corresponding to Application No. PCT/US22/25012 on Aug. 19, 2022.
EP Search Report mailed on Jun. 2, 2025 for application 22789011.8, 16 pages.

* cited by examiner

POLYOXYMETHYLENE POLYMER COMPOSITION FOR ROTATIONAL MOLDING APPLICATIONS

RELATED APPLICATIONS

The present application is based upon and claims priority to U.S. Provisional Patent Application Ser. No. 63/175,783, having a filing date of Apr. 16, 2021; U.S. Provisional Patent Application Ser. No. 63/240,503, having a filing date of Sep. 3, 2021; and U.S. Provisional Patent Application Ser. No. 63/296,578, having a filing date of Jan. 5, 2022, which are all incorporated herein by reference.

BACKGROUND

Hollow vessels can be made using various different types of molding processes and techniques. One particular type of process is referred to as rotational molding. During rotational molding, a polymer material is placed in a mold and heated above its softening temperature causing the polymer material to become molten and flow. During the heating process, the mold is rotated about at least one axis, and typically about at least two different axes. The centrifugal force causes the polymer material to line the walls of the mold and form a hollow vessel. Rotational molding offers various advantages because the process can produce seamless hollow products with high complexity. The processing window of the polymer material, however, has limited the use of rotational molding to particular types of polymers, such as polyethylene polymers and polyamide polymers.

In the past, various attempts have been made in order to incorporate polyoxymethylene polymers into rotational molding applications in order to produce hollow vessels, such as liquid tanks. Polyoxymethylene polymers offer good chemical resistance, rigidity, and resilience. In fact, many polyoxymethylene polymers have a low and sharp melting point and recrystallization characteristics compared to polyamide polymers that may provide processing cycle time advantages. Problems have been experienced, however, in producing rotomolded hollow vessels from polyoxymethylene polymers that have suitable impact resistance, especially in comparison to various other polymers.

In view of the above, in the past, polyoxymethylene polymers have been combined with various additives in order to improve the impact resistance properties of products made from the polymer composition. For example, U.S. Pat. No. 8,008,390 discloses a compounded polyoxymethylene polymer material for rotational molding applications that is intended to have increased impact resistance. The '390 patent is incorporated herein by reference.

Combining a polyoxymethylene polymer with various additives in order to increase impact resistance for rotational molding applications, however, has presented various problems. For instance, many of the hollow vessels produced during rotational molding are intended to contain liquids. Combining a polyoxymethylene polymer with various additives can adversely affect the permeability characteristics of the polymer material, especially when tested against petroleum-based materials. In addition, adding additives to a polyoxymethylene polymer during rotational molding can result in phase separation during the process producing products that are not commercially suitable.

In view of the above, a need currently exists for a polyoxymethylene polymer composition well suited for rotational molding applications. A need also exists for a polyoxymethylene polymer composition that can be rotomolded into single layer hollow vessels that have good fluid permeability characteristics.

SUMMARY

The present disclosure is generally directed to a powder composition comprised of polymeric particles that contain a polyoxymethylene polymer. The powder composition is particularly formulated for use in rotational molding applications. For example, the powder can have a particle size distribution and can be formulated so that the powder is not only well suited for producing articles through rotational molding but also produces hollow vessels that have excellent physical properties, including impact strength resistance in combination with excellent permeability characteristics that prevents liquid vapors and gases from escaping from the hollow vessel when containing fluids, such as gases and liquids.

In one embodiment, for instance, the present disclosure is directed to a polymer composition for rotational molding applications. The polymer composition comprises polymer particles containing a polyoxymethylene polymer blended with one or more impact modifiers. The polyoxymethylene polymer can have a relatively low melt flow rate. For example, the melt flow rate of the polyoxymethylene polymer can be less than about 8 g/10 min, such as less than about 5 g/10 min, such as less than about 4 g/10 min, such as less than about 3 g/10 min, and generally greater than about 0.5 g/10 min. The polyoxymethylene polymer can be present in the polymer composition in an amount of at least about 55% by weight. The one or more impact modifiers can be present in the polymer composition in an amount from about 4% by weight to about 27% by weight.

The polymer particles can have a particle size distribution that has been found to be effective for rotational molding applications. For instance, the polymer particles can have a particle size distribution such that at least 10% by weight of the particles have a particle size greater than about 625 microns, such as greater than about 630 microns, such as greater than about 635 microns, such as greater than about 640 microns. The polymer particles can also have a particle size distribution such that the $D_{10}$ particle size is from about 90 microns to about 300 microns, such as from about 110 microns to about 220 microns. The $D_{50}$ particle size can from about 150 microns to about 400 microns, such as from about 175 microns to about 375 microns. The $D_{75}$ particle size can be from about 380 microns to about 680 microns, such as from about 400 microns to about 650 microns. The above particle size ranges are exemplary and, in certain applications, smaller particle sizes may be used.

Various different impact modifiers can be combined with the polyoxymethylene polymer. For instance, the impact modifier can comprise one or more thermoplastic elastomers. In one aspect, for instance, the impact modifier can be a thermoplastic polyurethane elastomer alone or in combination with a thermoplastic copolyester elastomer. In another embodiment, the impact modifier may comprise one or more thermoplastic copolyester elastomers. The thermoplastic copolyester elastomer can comprise a block copolymer of polybutylene terephthalate and polyether segments. Alternatively, the thermoplastic copolyester elastomer can comprise a thermoplastic ester ether elastomer.

The polyoxymethylene polymer contained in the polymer composition can be a polyoxymethylene copolymer. The polyoxymethylene polymer can contain various different types of end groups or terminal groups. In one aspect, the polyoxymethylene polymer contains hydroxyl groups in an amount less than about 10 mmol/kg, such as in an amount less than about 8 mmol/kg, such as in an amount less than about 6 mmol/kg, such as in an amount less than about 4 mmol/kg. When containing relatively low amounts of hydroxyl groups, the polymer composition can be polyisocyanate free. Alternatively, the polyoxymethylene polymer can have higher amounts of hydroxyl groups in combination with a coupling agent that comprises a polyisocyanate.

The present disclosure is also directed to a container for liquids and gases, such as for petroleum-based fuels. The container can include a seamless rotational molded housing defining an opening configured to receive a fluid. The housing can include an interior enclosure surrounded by a wall. The wall can be made from a polymer composition comprising a polyoxymethylene polymer having a melt flow rate of less than about 5 g/10 min. The polymer composition can further contain one or more impact modifiers that are present in the polymer composition in an amount from about 4% by weight to about 27% by weight. The wall of the housing can be made from only a single layer of the polymer composition and can have a normalized permeation of less than 4 g-mm/$m^2$ per day at 40° C. according to SAE Test J2665. For example, the wall can have a normalized permeation of less than about 3.5 g-mm/$m^2$ per day at 40° C.

The wall can also be tested according to Test Method US EPA 40 CFR Part 1060.520 and can display a permeation of less than about 1.1 g/$m^2$/day, such as less than about 0.9 g/$m^2$/day, such as less than about 0.7 g/$m^2$/day (and generally greater than about 0.01 g/$m^2$/day). In addition, even when made from a single layer of material, the wall can display a stabilization parameter of greater than about 0.95, such as greater than about 0.97, such as greater than about 0.98 ($r^2$). The above result can be obtained after a soak duration of ten weeks and at a test temperature of 28° C.

The container can have a multiaxial impact strength of greater than about 5 ftlb-f at 23° C., such as greater than about 7.5 ftlb-f at 23° C., such as greater than about 10 ftlb-f at 23° C., such as greater than about 15 ftlb-f at 23° C., such as greater than about 20 ftlb-f at 23° C., such as greater than about 30 ftlb-f at 23° C., such as greater than about 40 ftlb-f at 23° C., and generally less than about 80 ftlb-f at 23° C. The wall thickness can be from about 0.5 mm to about 10 mm. In one embodiment, the container can be a fuel tank.

Other features and aspects of the present disclosure are discussed in greater detail below.

BRIEF DESCRIPTION OF THE DRAWINGS

A full and enabling disclosure of the present disclosure is set forth more particularly in the remainder of the specification, including reference to the accompanying FIGURES, in which.

Figure 1:
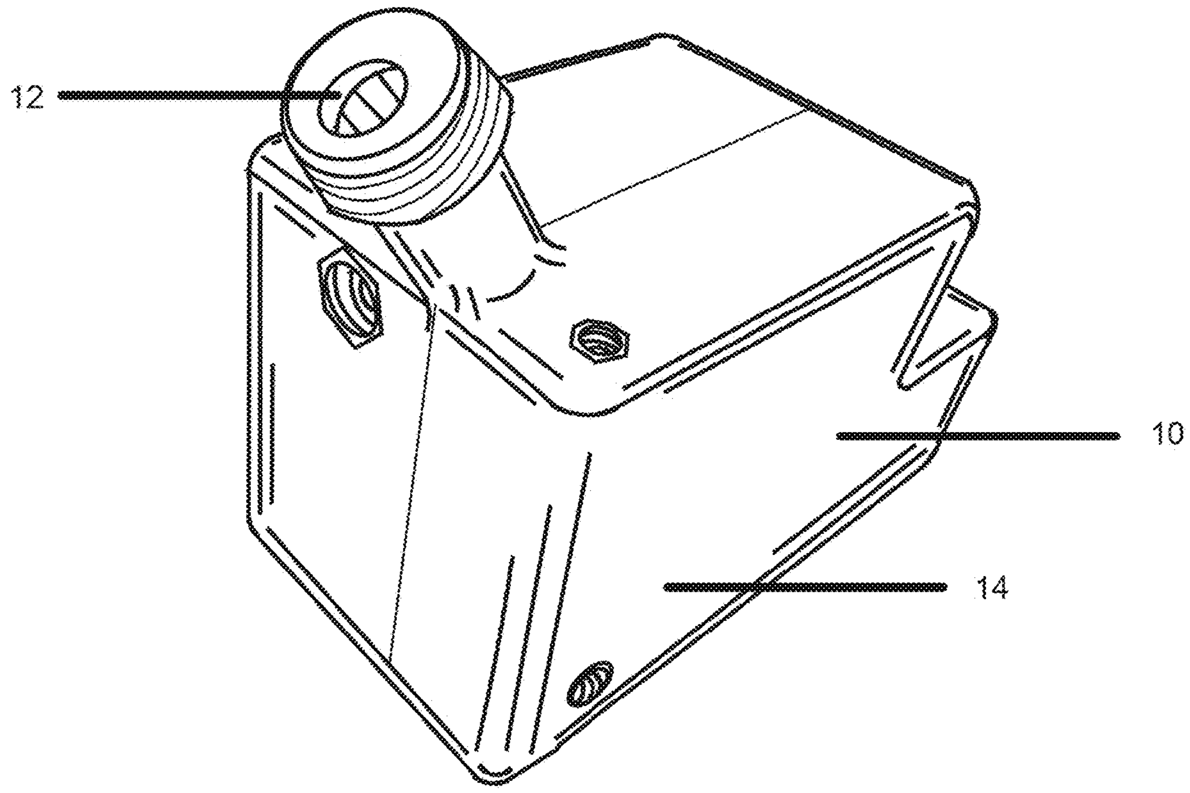
FIG. 1 is a perspective view of one embodiment of a container made in accordance with the present disclosure.

Repeat use of reference characters in the present specification and drawings is intended to represent the same or analogous features or elements of the present invention.

DETAILED DESCRIPTION

It is to be understood by one of ordinary skill in the art that the present discussion is a description of exemplary embodiments only and is not intended as limiting the broader aspects of the present disclosure.

The present disclosure is generally directed to a polymer composition containing a polyoxymethylene polymer and one or more impact modifiers. The polymer composition is in the form of a powder having a controlled particle size. In addition, the polyoxymethylene polymer can be particularly selected so as to have thermal characteristics well suited for use in rotational molding applications.

The polymer composition of the present disclosure containing one or more impact modifiers has been found to have dramatically improved properties that can be processed easier during a rotational molding process for producing hollow vessels or articles having better physical properties and less imperfections. The one or more impact modifiers, for instance, can decrease the stiffness of the polyoxymethylene polymer, increase the impact resistance of articles made from the polymer composition, and decrease the shrinkage properties of the polymer. The polymer composition is also formulated and has a particle size that improves the operating window of the polymer. For example, rotational molding is a relatively slow molding process. For example, rotational molding processes typically have longer cycle times than many other processes, such as injection molding. The polymer composition of the present disclosure, however, is formulated to be more thermally stable for the longer cycle times and have thermal properties that cause the polymer composition to flow over the mold in a manner that produces less voids.

The use of a polyoxymethylene polymer for rotational molding processes can offer various advantages and benefits. Polyoxymethylene copolymers, for instance, possess a linear structure with a highly crystalline quality that provides a variety of characteristics including outstanding wear, long-term fatigue, toughness and creep resistance as well as excellent resistance to moisture, solvents, and strong alkalis. The chemical structure of polyoxymethylene polymers provides a higher stability to thermal and oxidative degradation compared to many different polymers. The use of a polyoxymethylene copolymer is, in fact, more thermally stable and resistant to degradation than a polyoxymethylene homopolymer. The polyoxymethylene polymer is formulated to increase the impact resistance while maintaining excellent permeability characteristics. The polymer composition of the present disclosure, for instance, can be used to produce containers or hollow vessels for containing all different types of fluids, including compressed gases and fuels. The containers have excellent impact resistance while also being relatively impermeable to fuel vapors and other gases. In fact, the polymer composition of the present disclosure can be used to produce a single layer container or vessel that provides impact resistance and excellent permeability characteristics without having to add further layers to the walls of the container or to subject the container to a secondary process such as fluorination.

As described above, the polymer composition of the present disclosure is in the form of a powder. The powder composition has a controlled particle size distribution that has been found to provide advantages and benefits during rotational molding processes. For instance, the powder can have fluid-like flow properties. Thus, the polymer composition can be easy to handle for loading into the mold and will circulate uniformly within the mold during rotation of the mold. The particle size distribution, for instance, can lead to the formation of articles with greater accuracy and tolerances.

The particle size distribution in combination with the combination of different components that make up the polymer composition can also produce a polymer composition with lower shrinkage and less internal stress during the molding process. The particle size distribution in combination with the formulation also provide for a relatively large operating window during the molding process. For example, the polymer composition has thermal properties that make the composition well suited for longer cycle time with greater stability. In this manner, the polymer composition, once molten, flows uniformly over the surface of the mold and produces molded articles with little to no voids.

In one embodiment, in order to account for longer cycle times, the particle size distribution of the polymer composition includes relatively large particle sizes (although smaller sizes may be used depending on the application). For example, in one aspect, greater than 10% by weight of the particles can have a particle size of greater than about 625 microns, such as greater than about 630 microns, such as greater than about 635 microns, such as greater than about 640 microns. In particular applications, greater than 10% of the particles can have a particle size of greater than about 660 microns, such as greater than about 680 microns, such as greater than about 700 microns. The above 10% by weight of particles generally has an average particle size of less than about 1200 microns, such as less than about 1000 microns, such as less than about 900 microns, such as less than about 850 microns.

In addition to a $D_{10}$ particle size, the particle size distribution of the polymer composition can also be described in terms of a $D_{50}$ particle size, a $D_{75}$ particle size, and a $D_{10}$ particle size. For example, the powder composition can have a $D_{50}$ particle size of generally greater than 150 microns, such as greater than about 160 microns, such as greater than about 175 microns, such as greater than about 200 microns, such as greater than about 225 microns, such as greater than about 250 microns, such as greater than about 275 microns, such as greater than about 290 microns. The $D_{50}$ particle size is generally less than about 600 microns, such as less than about 550 microns, such as less than about 500 microns, such as less than about 450 microns.

The polymer composition in the form of a powder can have a $D_{10}$ particle size (smallest particles) of generally greater than about 90 microns, such as greater than about 100 microns, such as greater than about 110 microns, such as greater than about 120 microns, such as greater than about 130 microns, and generally less than about 300 microns, such as less than about 250 microns, such as less than about 220 microns. The powder composition can have a $D_{75}$ particle size of generally greater than about 380 microns, such as greater than about 400 microns, such as greater than about 420 microns, such as greater than about 440 microns, and generally less than about 700 microns, such as less than about 650 microns, such as less than about 625 microns, such as less than about 600 microns, such as less than about 590 microns. Particle size can be determined using a laser scattering particle size distribution analyzer, such as a Beckman Coulter LS 13 320 particle size analyzer.

In an alternative embodiment, the particle size distribution of the polymer composition can include smaller particles than described above when using a particular type of polyoxymethylene polymer in combination with various impact modifiers. For example, in another embodiment, the polymer composition can have a particle size distribution such that 90% of the particles have a size of less than about 500 microns. 50% of the particles can have a particle size of from about 450 microns to about 250 microns, such as from about 420 microns to about 300 microns. From about 30% to about 50% of the particles by mass can have a particle size of from about 250 microns to about 500 microns.

In still another embodiment, the particle size distribution of the polymer composition can be such that 90% of the particles have a size less than about 420 microns, such as less than about 400 microns, such as less than about 380 microns. 50% of the particles by mass can have a particle size of from about 250 microns to about 177 microns. From about 45% to about 60% of the particles by mass can have a particle size of from about 420 microns to about 177 microns, such as from about 350 microns to about 170 microns, such as from about 280 microns to about 177 microns. In addition to using light scattering for determining particle size, in an alternative embodiment, a sieve test can be used. For example, particle size (based on mass) can be determined using a RO-TAP sieve shaker.

As described above, the polymer composition of the present disclosure generally contains a polyoxymethylene polymer combined with one or more impact modifiers in addition to various other components. The polyoxymethylene polymer can be a polyoxymethylene copolymer.

The preparation of the polyoxymethylene polymer can be carried out by polymerization of polyoxymethylene-forming monomers, such as trioxane or a mixture of trioxane and a cyclic acetal such as dioxolane in the presence of a molecular weight regulator, such as a glycol. According to one embodiment, the polyoxymethylene is a homo- or copolymer which comprises at least 50 mol. %, such as at least 75 mol. %, such as at least 90 mol. % and such as even at least 97 mol. % of $—CH_2O$-repeat units.

In one embodiment, a polyoxymethylene copolymer is used. The copolymer can contain from about 0.1 mol. % to about 20 mol. % and in particular from about 0.5 mol. % to about 10 mol. % of repeat units that comprise a saturated or ethylenically unsaturated alkylene group having at least 2 carbon atoms, or a cycloalkylene group, which has sulfur atoms or oxygen atoms in the chain and may include one or more substituents selected from the group consisting of alkyl cycloalkyl, aryl, aralkyl, heteroaryl, halogen or alkoxy. In one embodiment, a cyclic ether or acetal is used that can be introduced into the copolymer via a ring-opening reaction.

Preferred cyclic ethers or acetals are those of the formula:

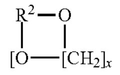

in which x is 0 or 1 and $R^2$ is a $C_2$-$C_4$-alkylene group which, if appropriate, has one or more substituents which are $C_1$-$C_4$-alkyl groups, or are $C_1$-$C_4$-alkoxy groups, and/or are halogen atoms, preferably chlorine atoms. Merely by way of example, mention may be made of ethylene oxide, propylene 1,2-oxide, butylene 1,2-oxide, butylene 1,3-oxide, 1,3-dioxane, 1,3-dioxolane, and 1,3-dioxepan as cyclic ethers, and also of linear oligo- or polyformals, such as polydioxolane or polydioxepan, as comonomers. It is particularly advantageous to use copolymers composed of from 99.5 to 95 mol. % of trioxane and of from 0.5 to 5 mol. %, such as from 0.5 to 4 mol. %, of one of the above-mentioned comonomers.

In one particular aspect of the present disclosure, the polyoxymethylene copolymer incorporated into the powder composition contains a relatively low amount of comonomer. For example, the polyoxymethylene copolymer can contain a comonomer, such as dioxolane, in an amount less than about 5% by weight, such as in an amount less than about 2% by weight, such as in an amount less than about 1.5% by weight, such as in an amount less than about 1% by weight, such as in an amount less than about 0.75% by weight, such as in an amount less than about 0.7% by weight. The comonomer content is generally greater than about 0.3% by weight, such as greater than about 0.5% by weight.

The polymerization can be effected as precipitation polymerization or in the melt. By a suitable choice of the polymerization parameters, such as duration of polymerization or amount of molecular weight regulator, the molecular weight and hence the MVR value of the resulting polymer can be adjusted.

The polyoxymethylene polymer incorporated into the polymer composition can have various different terminal groups or end groups depending upon the particular application and the other components contained in the composition. In one aspect, the polyoxymethylene polymer is relatively thermally stable. For instance, the polyoxymethylene polymer can contain hemiformal groups in an amount less than about 2 mol %, such as in an amount less than about 1.5 mol %, such as in an amount less than about 1 mol %, such as in an amount less than about 0.8 mol %, such as in an amount less than about 0.6 mol %.

The amount of hydroxyl end groups on the polyoxymethylene polymer can depend on whether a polyisocyanate coupling agent is present in the composition. When a polyisocyanate coupling agent is not present, for instance, the polyoxymethylene polymer can have a terminal hydroxyl group content of less than about 10 mmol/kg, such as less than about 8 mmol/kg, such as less than about 6 mmol/kg, such as less than about 4 mmol/kg.

Alternatively, the polyoxymethylene polymer can contain greater amounts of terminal hydroxyl groups. In one embodiment, the polyoxymethylene polymer has a content of terminal hydroxyl groups of at least 15 mmol/kg, such as at least 18 mmol/kg, such as at least 20 mmol/kg, such as greater than about 25 mmol/kg, such as greater than about 30 mmol/kg, such as greater than about 40 mmol/kg, such as greater than about 50 mmol/kg. The terminal hydroxyl content is generally less than about 300 mmol/kg, such as less than about 200 mmol/kg, such as less than about 100 mmol/kg. In one embodiment, the terminal hydroxyl group content ranges from 18 to 50 mmol/kg. The quantification of the hydroxyl group content in the polyoxymethylene polymer may be conducted by the method described in JP-A-2001-11143.

In addition to the terminal hydroxyl groups, the polyoxymethylene polymer may also have other terminal groups usual for these polymers. Examples of these are alkoxy groups, formate groups, acetate groups or aldehyde groups. In one aspect, the polyoxymethylene polymer can also contain terminal-$NH_2$ groups. According to one embodiment, the polyoxymethylene is a copolymer which comprises at least 50 mol-%, such as at least 75 mol-%, such as at least 90 mol-% and such as even at least 95 mol-% of —$CH_2O$-repeat units.

The polyoxymethylene polymer can have any suitable molecular weight. The molecular weight of the polymer, for instance, can be from about 4,000 grams per mole to about 100,000 g/mol. The polyoxymethylene polymer, for instance, can have a molecular weight of greater than about 10,000 g/mol, such as greater than about 15,000 g/mol, such as greater than about 20,000 g/mol, such as greater than about 30,000 g/mol, such as greater than about 40,000 g/mol, and generally less than about 90,000 g/mol.

The polyoxymethylene polymer present in the composition can generally have a melt flow index (MFI) ranging from about 0.1 to about 200 g/10 min, as determined according to ISO 1133 at 190° C. and 2.16 kg. In one aspect, however, the polyoxymethylene polymer has a relatively low melt flow index. The lower melt flow index has been found to result in a polymer composition having a larger operating window when used in rotational molding processes. In addition, the lower melt flow rate can lead to better physical properties. For instance, the polyoxymethylene polymer can have a melt flow rate of less than about 8 g/10 min, such as less than about 5 g/10 min, such as less than about 4 g/10 min, such as less than about 3 g/10 min, such as less than about 2 g/10 min, such as less than about 1 g/10 min, and generally greater than about 0.5 g/10 min.

The polyoxymethylene polymer may be present in the polyoxymethylene polymer composition in an amount of at least 40 wt. %, such as at least 45 wt. %, such as at least 55 wt. %, such as at least 60 wt. %, such as at least 70 wt. %, such as at least 80 wt. %. The polyoxymethylene polymer can be present in an amount less than about 96% by weight, such as in an amount less than about 85% by weight, such as in an amount less than about 80% by weight, such as in an amount less than about 75% by weight.

In accordance with the present disclosure, the polyoxymethylene polymer is combined with one or more impact modifiers. Examples of impact modifiers that may be incorporated into the composition include thermoplastic elastomers, a methacrylate butadiene styrene, a styrene acrylonitrile, and mixtures thereof. In one aspect, the impact modifier can be a core and shell impact modifier. Combinations of different impact modifiers may be used in order to enhance various properties of the polymer composition or of articles made from the composition. For example, the polymer composition can contain two or more thermoplastic elastomers.

Various different thermoplastic elastomers may be used as the impact modifier. Thermoplastic elastomers well suited for use in the present disclosure are polyester elastomers (TPE-E), thermoplastic polyamide elastomers (TPE-A) and in particular thermoplastic polyurethane elastomers (TPE-U). The above thermoplastic elastomers have active hydrogen atoms which can be reacted with a coupling reagent and/or the polyoxymethylene polymer. Examples of such groups are urethane groups, amido groups, amino groups or hydroxyl groups. For instance, terminal polyester diol flexible segments of thermoplastic polyurethane elastomers have hydrogen atoms which can react, for example, with isocyanate groups.

In one particular embodiment, a thermoplastic polyurethane elastomer is used as the impact modifier either alone or in combination with other impact modifiers. The thermoplastic polyurethane elastomer, for instance, may have a soft segment of a long-chain dial and a hard segment derived from a diisocyanate and a chain extender. In one embodiment, the polyurethane elastomer is a polyester type prepared by reacting a long-chain diol with a diisocyanate to produce a polyurethane prepolymer having isocyanate end groups, followed by chain extension of the prepolymer with a diol chain extender. Representative long-chain diols are polyester diols such as poly(butylene adipate)diol, polyethylene adipate)diol and poly(E-caprolactone)diol; and polyether diols such as poly(tetramethylene ether)glycol, poly(propylene oxide)glycol and poly(ethylene oxide)glycol. Suitable diisocyanates include 4,4'-methylenebis(phenyl isocyanate), 2,4-toluene diisocyanate, 1,6-hexamethylene diisocyanate and 4,4'-methylenebis-(cycloxylisocyanate). Suitable chain extenders are $C_2$-$C_6$ aliphatic dials such as ethylene glycol, 1,4-butanediol, 1,6-hexanedial and neopentyl glycol. One example of a thermoplastic polyurethane is characterized as essentially poly (adipic acid-co-butylene glycol-co-diphenylmethane diisocyanate).

In one embodiment, the impact modifier can be a polyester-based thermoplastic polyurethane. The polyester-based thermoplastic polyurethane, for instance, can have a Shore A hardness of from about 80 to about 90, such as from about 83 to about 87. The thermoplastic polyurethane can have a Shore D hardness of from about 33 to about 43, such as from about 35 to about 39.

In an alternative embodiment, a carbonate-based thermoplastic polyurethane block copolymer can be used. The carbonate-based thermoplastic polyurethane elastomer can have the same Shore A and Shore D hardness ranges as described above.

In one embodiment, the thermoplastic elastomer may comprise a thermoplastic polyester elastomer. The thermoplastic polyester elastomer can be, for instance, a thermoplastic copolyester elastomer that comprises a thermoplastic ester ether elastomer. In one aspect, the thermoplastic polyester elastomer can be a thermoplastic copolyester elastomer that comprises a block copolymer of polybutylene terephthalate and polyether segments.

In one embodiment, the polymer composition may contain a segmented thermoplastic copolyester. The thermoplastic polyester elastomer, for example, may comprise a multiblock copolymer. Useful segmented thermoplastic copolyester elastomers include a multiplicity of recurring long chain ester units and short chain ester units joined head to tail through ester linkages. The long chain units can be represented by the formula $$-OGO-\overset{\overset{O}{\|}}{C}R\overset{\overset{O}{\|}}{C}-$$

and the short chain units can be represented by the formula $$-OGO-\overset{\overset{O}{\|}}{C}R\overset{\overset{O}{\|}}{C}-$$

where G is a divalent radical remaining after the removal of the terminal hydroxyl groups from a long chain polymeric glycol having a number average molecular weight in the range from about 600 to 6,000 and a melting point below about 55° C., R is a hydrocarbon radical remaining after removal of the carboxyl groups from dicarboxylic acid having a molecular weight less than about 300, and D is a divalent radical remaining after removal of hydroxyl groups from low molecular weight diols having a molecular weight less than about 250.

The short chain ester units in the copolyetherester provide about 15 to 95% of the weight of the copolyetherester, and about 50 to 100% of the short chain ester units in the copolyetherester are identical.

The term "long chain ester units" refers to the reaction product of a long chain glycol with a dicarboxylic acid. The long chain glycols are polymeric glycols having terminal (or nearly terminal as possible) hydroxy groups, a molecular weight above about 600, such as from about 600-6000, a melting point less than about 55° C. and a carbon to oxygen ratio about 2.0 or greater. The long chain glycols are generally poly(alkylene oxide) glycols or glycol esters of poly(alkylene oxide) dicarboxylic acids. Any substituent groups can be present which do not interfere with polymerization of the compound with glycol(s) or dicarboxylic acid(s), as the case may be. The hydroxy functional groups of the long chain glycols which react to form the copolyesters can be terminal groups to the extent possible. The terminal hydroxy groups can be placed on end capping glycol units different from the chain, i.e., ethylene oxide end groups on poly(propylene oxide glycol).

The term "short chain ester units" refers to low molecular weight compounds or polymer chain units having molecular weights less than about 550. They are made by reacting a low molecular weight diol (below about 250) with a dicarboxylic acid.

The dicarboxylic acids may include the condensation polymerization equivalents of dicarboxylic acids, that is, their esters or ester-forming derivatives such as acid chlorides and anhydrides, or other derivatives which behave substantially like dicarboxylic acids in a polymerization reaction with a glycol.

The dicarboxylic acid monomers for the elastomer have a molecular weight less than about 300. They can be aromatic, aliphatic or cycloaliphatic. The dicarboxylic acids can contain any substituent groups or combination thereof which do not interfere with the polymerization reaction. Representative dicarboxylic acids include terephthalic and isophthalic acids, bibenzoic acid, substituted dicarboxy compounds with benzene nuclei such as bis(p-carboxyphenyl) methane, p-oxy-(p-carboxyphenyl) benzoic acid, ethylene-bis(p-oxybenzoic acid), 1,5-naphthalene dicarboxylic acid, 2,6-naphthalene dicarboxylic acid, 2,7-naphthalene dicarboxylic acid, phenanthrenecarboxylic acid, anthracenedicarboxylic acid, 4,4'-sulfonyl dibenzoic acid, etc. and $C_1$-$C_{10}$ alkyl and other ring substitution derivatives thereof such as halo, alkoxy or aryl derivatives. Hydroxy acids such as p(β-hydroxyethoxy) benzoic acid can also be used providing an aromatic dicarboxylic acid is also present.

Representative aliphatic and cycloaliphatic acids are sebacic acid, 1,3- or 1,4-cyclohexane dicarboxylic acid, adipic acid, glutaric acid, succinic acid, carbonic acid, oxalic acid, itaconic acid, azelaic acid, diethylmalonic acid, fumaric acid, citraconic acid, allylmalonate acid, 4-cyclohexene-1,2-dicarboxylate acid, pimelic acid, suberic acid, 2,5-diethyladipic acid, 2-ethylsuberic acid, 2,2,3,3-tetramethylsuccinic acid, cyclopentanedicarboxylic acid, decahydro-1,5-(or 2,6-) naphthalenedicarboxylic acid, 4,4'-bicyclohexyl dicarboxylic acid, 4,4'-methylenebis(cyclohexyl carboxylic acid), 3,4-furan dicarboxylate, and 1,1-cyclobutane dicarboxylate.

The dicarboxylic acid may have a molecular weight less than about 300. In one embodiment, phenylene dicarboxylic acids are used such as terephthalic and isophthalic acid.

Included among the low molecular weight (less than about 250) diols which react to form short chain ester units of the copolyesters are acyclic, alicyclic and aromatic dihydroxy compounds. Included are diols with 2-15 carbon atoms such as ethylene, propylene, isobutylene, tetramethylene, pentamethylene, 2,2-dimethyltrimethylene, hexamethylene and decamethylene glycols, dihydroxy cyclohexane, cyclohexane dimethanol, resorcinol, hydroquinone, 1,5-dihydroxy naphthalene, etc. Also included are aliphatic diols containing 2-8 carbon atoms. Included among the bis-phenols which can be used are bis(p-hydroxy) diphenyl, bis(p-hydroxyphenyl) methane, and bis(p-hydroxyphenyl) propane. Equivalent ester-forming derivatives of diols are also useful (e.g., ethylene oxide or ethylene carbonate can be used in place of ethylene glycol). Low molecular weight diols also include such equivalent ester-forming derivatives.

Long chain glycols which can be used in preparing the polymers include the poly(alkylene oxide) glycols such as polyethylene glycol, poly(1,2- and 1,3-propylene oxide) glycol, poly(tetramethylene oxide) glycol, poly(pentamethylene oxide) glycol, poly(hexamethylene oxide) glycol, poly (heptamethylene oxide) glycol, poly(octamethylene oxide) glycol, poly(nonamethylene oxide) glycol and poly(1,2-butylene oxide) glycol; random and block copolymers of ethylene oxide and 1,2-propylene oxide and poly-formals prepared by reacting formaldehyde with glycols, such as pentamethylene glycol, or mixtures of glycols, such as a mixture of tetramethylene and pentamethylene glycols.

In addition, the dicarboxymethyl acids of poly(alkylene oxides) such as the one derived from polytetramethylene oxide $HOOCCH_2(OCH_2CH_2CH_2CH_2)_xOCH_2COOH$ IV can be used to form long chain glycols in situ. Polythioether glycols and polyester glycols also provide useful products. In using polyester glycols, care must generally be exercised to control a tendency to interchange during melt polymerization, but certain sterically hindered polyesters, e.g., poly (2,2-dimethyl-1,3-propylene adipate), poly(2,2-dimethyl-1,3-propylene/2-methyl-2-ethyl-1,3-propylene 2,5-dimethylterephthalate), poly(2,2-dimethyl-1,3-propylene/2,2-diethyl-1,3-propylene, 1,4 cyclohexanedicarboxylate) and poly(1,2-cyclohexylenedimethylene/2,2-dimethyl-1,3-propylene 1,4-cyclohexanedicarboxylate) can be utilized under normal reaction conditions and other more reactive polyester glycols can be used if a short residence time is employed. Either polybutadiene or polyisoprene glycols, copolymers of these and saturated hydrogenation products of these materials are also satisfactory long chain polymeric glycols. In addition, the glycol esters of dicarboxylic acids formed by oxidation of polyisobutylenediene copolymers are useful raw materials.

Although the long chain dicarboxylic acids (IV) above can be added to the polymerization reaction mixture as acids, they react with the low molecular weight diols(s) present, these always being in excess, to form the corresponding poly(alkylene oxide) ester glycols which then polymerize to form the G units in the polymer chain, these particular G units having the structure $$—DOCCH_2(OCH_2CH_2CH_2CH_2)_xOCH_2COODO$$

when only one low molecular weight diol (corresponding to D) is employed. When more than one diol is used, there can be a different diol cap at each end of the polymer chain units. Such dicarboxylic acids may also react with long chain glycols if they are present, in which case a material is obtained having a formula the same as V above except the Ds are replaced with polymeric residues of the long chain glycols. The extent to which this reaction occurs is quite small, however, since the low molecular weight diol is present in considerable molar excess.

In place of a single low molecular weight diol, a mixture of such diols can be used. In place of a single long chain glycol or equivalent, a mixture of such compounds can be utilized, and in place of a single low molecular weight dicarboxylic acid or its equivalent, a mixture of two or more can be used in preparing the thermoplastic copolyester elastomers which can be employed in the compositions of this invention. Thus, the letter "G" in Formula II above can represent the residue of a single long chain glycol or the residue of several different glycols, the letter D in Formula III can represent the residue of one or several low molecular weight diols and the letter R in Formulas II and III can represent the residue of one or several dicarboxylic acids. When an aliphatic acid is used which contains a mixture of geometric isomers, such as the cis-trans isomers of cyclohexane dicarboxylic acid, the different isomers should be considered as different compounds forming different short chain ester units with the same diol in the copolyesters. The copolyester elastomer can be made by conventional ester interchange reaction.

Copolyether esters with alternating, random-length sequences of either long chain or short chain oxyalkylene glycols can contain repeating high melting blocks that are capable of crystallization and substantially amorphous blocks with a relatively low glass transition temperature. In one embodiment, the hard segments can be composed of tetramethylene terephthalate units and the soft segments may be derived from aliphatic polyether and polyester glycols. Of particular advantage, the above materials resist deformation at surface temperatures because of the presence of a network of microcrystallites formed by partial crystallization of the hard segments. The ratio of hard to soft segments determines the characteristics of the material. Thus, another advantage to thermoplastic polyester elastomers is that soft elastomers and hard elastoplastics can be produced by changing the ratio of the hard and soft segments.

In one particular embodiment, the polyester thermoplastic elastomer has the following formula: $-[4GT]_x[BT]_y$, wherein 4G is butylene glycol, such as 1,4-butane diol, B is poly(tetramethylene ether glycol) and T is terephthalate, and wherein x is from about 0.60 to about 0.99 and y is from about 0.01 to about 0.40.

In one aspect, the thermoplastic polyester elastomer can be a block copolymer of polybutylene terephthalate and polyether segments and can have a structure as follows:

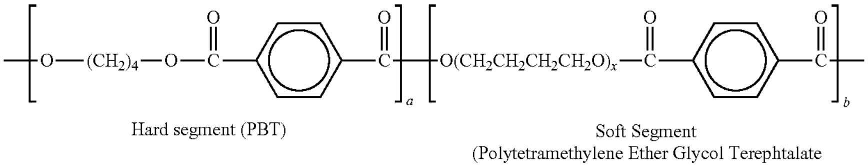

Hard segment (PBT)

Soft Segment
(Polytetramethylene Ether Glycol Terephtalate wherein a and b are integers and can vary from 2 to 10,000. The ratio between hard and soft segments in the block copolymer as described above can be varied in order to vary the properties of the elastomer. In one aspect, the density of the polyester elastomer as indicated above can be from about 1.05 g/cm$^3$ to about 1.15 g/cm$^3$, such as from about 1.08 g/cm$^3$ to about 1.1 g/cm$^3$.

In one embodiment, the polyoxymethylene polymer is combined with an impact modifier, such as a thermoplastic polyester elastomer, that has a melting temperature similar to the melting temperature of the polyoxymethylene polymer. For example, in one aspect, the impact modifier is selected such that the melting temperature of the impact modifier is within about 8° C., such as within about 5° C., such as within about 4° C., such as within about 3° C. of the melting temperature of the polyoxymethylene polymer. For example, an impact modifier, such as a polyester elastomer, can be selected with a melting temperature of from about 150° C. to about 185° C., such as from about 158° C. to about 172° C., such as from about 163° C. to about 169° C. Melting temperature can be determined according to ISO Test 11357-1/-3 (10° C./min) or can be determined according to ASTM Test D3417 (DSC).

In one embodiment, an impact modifier, such as a thermoplastic polyester elastomer, can be selected that has a melting temperature that is less than the melting temperature of the polyoxymethylene polymer. For instance, the melting temperature of the impact modifier can be less than about 164° C., such as less than about 161° C., such as less than about 158° C., such as less than about 155° C., such as less than about 153° C., and generally greater than about 140° C., such as greater than about 145° C., such as greater than about 148° C.

In an alternative embodiment, the impact modifier may comprise a non-aromatic polymer, which refers to a polymer that does not include any aromatic groups on the backbone of the polymer. Such polymers include acrylate polymers and/or graft copolymers containing an olefin. For instance, an olefin polymer can serve as a graft base and can be grafted to at least one vinyl polymer or one ether polymer. In still another embodiment, the graft copolymer can have an elastomeric core based on polydienes and a hard or soft graft envelope composed of a (meth)acrylate and/or a (meth) acrylonitrile.

Examples of impact modifiers as described above include ethylene-acrylic acid copolymer, ethylene-maleic anhydride copolymers, ethylene-alkyl(meth)acrylate-maleic anhydride terpolymers, ethylene-alkyl(meth)acrylate-glycidyl(meth) acrylate terpolymers, ethylene-acrylic ester-methacrylic acid terpolymer, ethylene-acrylic ester-maleic anhydride terpolymer, ethylene-methacrylic acid-methacrylic acid alkaline metal salt (ionomer) terpolymers, and the like. In one embodiment, for instance, the impact modifier can include a random terpolymer of ethylene, methylacrylate, and glycidyl methacrylate. The terpolymer can have a glycidyl methacrylate content of from about 5% to about 20%, such as from about 6% to about 10%. The terpolymer may have a methylacrylate content of from about 20% to about 30%, such as about 24%.

The impact modifier may be a linear or branched, homopolymer or copolymer (e.g., random, graft, block, etc.) containing epoxy functionalization, e.g., terminal epoxy groups, skeletal oxirane units, and/or pendent epoxy groups. For instance, the impact modifier may be a copolymer including at least one monomer component that includes epoxy functionalization. The monomer units of the impact modifier may vary. For example, the impact modifier can include epoxy-functional methacrylic monomer units. As used herein, the term methacrylic generally refers to both acrylic and methacrylic monomers, as well as salts and esters thereof, e.g., acrylate and methacrylate monomers. Epoxy-functional methacrylic monomers as may be incorporated in the impact modifier may include, but are not limited to, those containing 1,2-epoxy groups, such as glycidyl acrylate and glycidyl methacrylate. Other suitable epoxy-functional monomers include allyl glycidyl ether, glycidyl ethacrylate, and glycidyl itaconate.

Examples of other monomers may include, for example, ester monomers, olefin monomers, amide monomers, etc. In one embodiment, the impact modifier can include at least one linear or branched α-olefin monomer, such as those having from 2 to 20 carbon atoms, or from 2 to 8 carbon atoms. Specific examples include ethylene; propylene; 1-butene; 3-methyl-1-butene; 3,3-dimethyl-1-butene; 1-pentene; 1-pentene with one or more methyl, ethyl or propyl substituents; 1-hexene with one or more methyl, ethyl or propyl substituents; 1-heptene with one or more methyl, ethyl or propyl substituents; 1-octene with one or more methyl, ethyl or propyl substituents; 1-nonene with one or more methyl, ethyl or propyl substituents; ethyl, methyl or dimethyl-substituted 1-decene; 1-dodecene; and styrene.

In one embodiment, the impact modifier can be a terpolymer that includes epoxy functionalization. For instance, the impact modifier can include a methacrylic component that includes epoxy functionalization, an α-olefin component, and a methacrylic component that does not include epoxy functionalization. For example, the impact modifier may be poly(ethylene-co-methylacrylate-co-glycidyl methacrylate), which has the following structure:

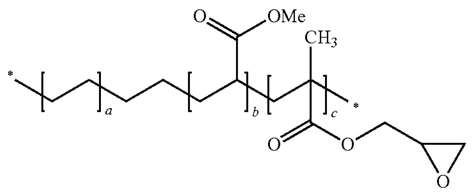

wherein, a, b, and c are 1 or greater.

In another embodiment the impact modifier can be a random copolymer of ethylene, ethyl acrylate and maleic anhydride having the following structure:

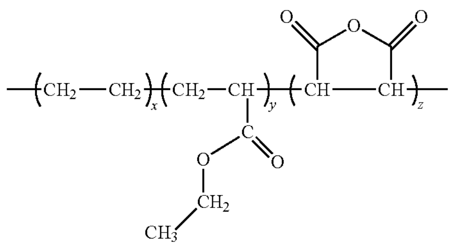

wherein x, y and z are 1 or greater.

The relative proportion of the various monomer components of a copolymeric impact modifier is not particularly limited. For instance, in one embodiment, the epoxy-functional methacrylic monomer components can form from about 1 wt. % to about 25 wt. %, or from about 2 wt. % to about 20 wt % of a copolymeric impact modifier. An α-olefin monomer can form from about 55 wt. % to about 95 wt. %, or from about 60 wt. % to about 90 wt. %, of a copolymeric impact modifier. When employed, other monomeric components (e.g., a non-epoxy functional methacrylic monomers) may constitute from about 5 wt. % to about 35 wt. %, or from about 8 wt. % to about 30 wt. %, of a copolymeric impact modifier.

The molecular weight of the above impact modifier can vary widely. For example, the impact modifier can have a number average molecular weight from about 7,500 to about 250,000 grams per mole, in some embodiments from about 15,000 to about 150,000 grams per mole, and in some embodiments, from about 20,000 to 100,000 grams per mole, with a polydispersity index typically ranging from 2.5 to 7.

In general, one or more impact modifiers may be present in the polymer composition in an amount from about 2% by weight to about 45% by weight, such as from about 4% by weight to about 27% by weight, including all increments of 1% by weight therebetween. For instance, one or more impact modifiers can be present in the polymer composition in an amount greater than about 6% by weight, such as in an amount greater than about 8% by weight, such as in an amount greater than about 10% by weight, such as in an amount greater than about 12% by weight, such as in an amount greater than about 14% by weight, such as in an amount greater than about 16% by weight, such as in an amount greater than about 20% by weight, such as in an amount greater than about 25% by weight, such as in an amount greater than about 30% by weight, such as in an amount greater than about 35% by weight, and generally in an amount less than about 50% by weight, such as less than about 40% by weight, such as less than about 25% by weight, such as in an amount less than about 23% by weight.

As described above, in various embodiments, the polymer composition can contain more than one impact modifier. For example, in one embodiment, the polymer composition can contain a thermoplastic polyurethane elastomer in combination with a thermoplastic polyester elastomer. For example, the thermoplastic polyester elastomer can be a thermoplastic ester ether elastomer. In one embodiment, a thermoplastic polyurethane elastomer can be combined with a thermoplastic copolyester elastomer that comprises a block copolymer of polybutylene terephthalate and polyether segments. Incorporating a block copolymer of a polybutylene terephthalate and polyether segments into the polymer composition can dramatically improve impact resistance, especially at lower temperatures. The weight ratio between the thermoplastic polyurethane elastomer and the thermoplastic copolyester elastomer can be from about 1:5 to about 5:1, such as from about 1:3 to about 3:1, such as from about 1.5:1 to about 1:1.5. In one aspect, for instance, a thermoplastic polyurethane elastomer can be present in the polymer composition in an amount from about 5% to about 12% by weight and a thermoplastic copolyester elastomer can be present in the polymer composition in an amount from about 5% to about 12% by weight. In one embodiment, a thermoplastic polyurethane elastomer can be present in the polymer composition in an amount from about 8% to about 15% by weight, such as from about 9% to about 11% by weight, and a thermoplastic copolyester elastomer can be present in the polymer composition also in an amount from about 8% to about 15% by weight, such as from about 9% to about 11% by weight.

In addition to a polyoxymethylene polymer and one or more impact modifiers, the polymer composition of the present disclosure can contain various other components. For instance, in one embodiment, a polyalkylene glycol can be incorporated into the polymer composition for providing various advantages and benefits. The polyalkylene glycol, for instance, can improve flow properties of the particles and/or can improve impact strength resistance.

Polyalkylene glycols particularly well suited for use in the polymer composition include polyethylene glycols, polypropylene glycols, and mixtures thereof.

The molecular weight of the polyalkylene glycol can vary depending upon various factors including the characteristics of the polyoxymethylene polymer and the process conditions for producing shaped articles. In one aspect, the polyalkylene glycol, such as the polyethylene glycol, can have a relatively low molecular weight. For example, the molecular weight can be less than about 10,000 g/mol, such as less than about 8,000 g/mol, such as less than about 6,000 g/mol, such as less than about 4,000 g/mol, and generally greater than about 1000 g/mol, such as greater than about 2000 g/mol. In one embodiment, a polyethylene glycol plasticizer is incorporated into the polymer composition that has a molecular weight of from about 2000 g/mol to about 5000 g/mol.

In another aspect, a polyalkylene glycol, such as the polyethylene glycol, can be selected that has a higher molecular weight. For example, the molecular weight of the polyalkylene glycol can be about 10,000 g/mol or greater, such as greater than about 20,000 g/mol, such as greater than about 30,000 g/mol, such as greater than about 35,000 g/mol, and generally less than about 100,000 g/mol, such as less than about 50,000 g/mol, such as less than about 45,000 g/mol, such as less than about 40,000 g/mol.

When present in the polymer composition, the polyalkylene glycol can be added in amounts greater than about 0.1% by weight, such as in an amount greater than about 0.3% by weight. The polyalkylene glycol can generally be present in the polymer composition in an amount less than about 5% by weight, such as in an amount less than about 3% by weight, such as in an amount less than about 1% by weight.

In one embodiment, in addition to one or more impact modifiers, the polymer composition can contain a coupling agent. The coupling agent can be used to compatibilize the different components. For instance, the coupling agent can couple to the polyoxymethylene polymer and to the one or more impact modifiers. It should be understood, however, that in one embodiment the polymer composition is formulated so as not to contain any coupling agents.

In one embodiment, the coupling agent comprises a polyisocyanate, such as a diisocyanate, such as an aliphatic, cycloaliphatic and/or aromatic diisocyanate. The coupling agent may be in the form of an oligomer, such as a trimer or a dimer.

In one embodiment, the coupling agent comprises a diisocyanate or a triisocyanate which is selected from 2,2'-, 2,4'-, and 4,4'-diphenylmethane diisocyanate (MDI); 3,3'-dimethyl-4,4'-biphenylene diisocyanate (TODD; toluene diisocyanate (TDI); polymeric MDI; carbodiimide-modified liquid 4,4'-diphenylmethane diisocyanate; para-phenylene diisocyanate (PPDI); meta-phenylene diisocyanate (MPDI); triphenyl methane-4,4'- and triphenyl methane-4,4"-triisocyanate; naphthylene-1,5-diisocyanate; 2,4'-, 4,4'-, and 2,2-biphenyl diisocyanate; polyphenylene polymethylene polyisocyanate (PMDI) (also known as polymeric PMDI); mixtures of MDI and PMDI; mixtures of PMDI and TDI; ethylene diisocyanate; propylene-1,2-diisocyanate; trimethylene diisocyanate; butylenes diisocyanate; bitolylene diisocyanate; tolidine diisocyanate; tetramethylene-1,2-diisocyanate; tetramethylene-1,3-diisocyanate; tetramethylene-1, 4-diisocyanate; pentamethylene diisocyanate; 1,6-hexamethylene diisocyanate (HDI); octamethylene diisocyanate; decamethylene diisocyanate; 2,2,4-trimethylhexamethylene diisocyanate; 2,4,4-trimethylhexamethylene diisocyanate; dodecane-1,12-diisocyanate; dicyclohexylmethane diisocyanate; cyclobutane-1,3-diisocyanate; cyclohexane-1,2-diisocyanate; cyclohexane-1,3-diisocyanate; cyclohexane-1,4-diisocyanate; diethylidene diisocyanate; methylcyclohexylene diisocyanate (HTDI); 2,4-methylcyclohexane diisocyanate; 2,6-methylcyclohexane diisocyanate; 4,4'-dicyclohexyl diisocyanate; 2,4'-dicyclohexyl diisocyanate; 1,3,5-cyclohexane triisocyanate; isocyanatomethylcyclohexane isocyanate; 1-isocyanato-3,3,5-trimethyl-5-isocyanatomethylcyclohexane; isocyanatomethylcyclohexane isocyanate; bis(isocyanatomethyl)-cyclohexane diisocyanate; 4,4'-bis(isocyanatomethyl) dicyclohexano; 2,4'-bis(isocyanatomethyl) dicyclohexano; isophorone diisocyanate (IPDI); dimeryl diisocyanate, dodecane-1,12-diisocyanate, 1,10-decamethylene diisocyanate, cyclohexylene-1,2-diisocyanate, 1,10-decamethylene diisocyanate, 1-chlorobenzene-2,4-diisocyanate, furfurylidene diisocyanate, 2,4,4-trimethyl hexamethylene diisocyanate, 2,2,4-trimethyl hexamethylene diisocyanate, dodecamethylene diisocyanate, 1,3-cyclopentane diisocyanate, 1,3-cyclohexane diisocyanate, 1,3-cyclobutane diisocyanate, 1,4-cyclohexane diisocyanate, 4,4'-methylenebis(cyclohexyl isocyanate), 4,4'-methylenebis(phenyl isocyanate), 1-methyl-2,4-cyclohexane diisocyanate, 1-methyl-2,6-cyclohexane diisocyanate, 1,3-bis(isocyanato-methyl)cyclohexane, 1,6-diisocyanato-2,2,4,4-tetra-methylhexane, 1,6-diisocyanato-2,4,4-tetra-trimethylhexane, trans-cyclohexane-1,4-diisocyanate, 3-isocyanato-methyl-3,5,5-trimethylcyclo-hexyl isocyanate, 1-isocyanato-3,3,5-trimethyl-5-isocyanatomethylcyclohexane, cyclo-hexyl isocyanate, dicyclohexylmethane 4,4'-diisocyanate, 1,4-bis(isocyanatomethyl)cyclohexane, m-phenylene diisocyanate, m-xylylene diisocyanate, m-tetramethylxylylene diisocyanate, p-phenylene diisocyanate, p,p'-biphenyl diisocyanate, 3,3'-dimethyl-4,4'-biphenylene diisocyanate, 3,3'-dimethoxy-4,4'-biphenylene diisocyanate, 3,3'-diphenyl-4,4'-biphenylene diisocyanate, 4,4'-biphenylene diisocyanate, 3,3'-dichloro-4,4'-biphenylene diisocyanate, 1,5-naphthalene diisocyanate, 4-chloro-1,3-phenylene diisocyanate, 1,5-tetrahydronaphthalene diisocyanate, metaxylene diisocyanate, 2,4-toluene diisocyanate, 2,4'-diphenylmethane diisocyanate, 2,4-chlorophenylene diisocyanate, 4,4'-diphenylmethane diisocyanate, p,p'-diphenylmethane diisocyanate, 2,4-tolylene diisocyanate, 2,6-tolylene diisocyanate, 2,2-diphenylpropane-4,4'-diisocyanate, 4,4'-toluidine diisocyanate, diamidine diisocyanate, 4,4'-diphenyl ether diisocyanate, 1,3-xylylene diisocyanate, 1,4-naphthylene diisocyanate, azobenzene-4,4'-diisocyanate, diphenyl sulfone-4,4'-diisocyanate, or mixtures thereof.

In one embodiment, an aromatic polyisocyanate is used, such as 4,4'-diphenylmethane diisocyanate (MDI).

When present, the coupling agent can be present in the composition in an amount generally from about 0.1% to about 5% by weight. In one embodiment, for instance, the coupling agent can be present in an amount from about 0.1% to about 2% by weight, such as from about 0.2% to about 1% by weight. In an alternative embodiment, the coupling agent can be added to the polymer composition in molar excess amounts when comparing the reactive groups on the coupling agent with the amount of functional groups on the polyoxymethylene polymer. As described above, in one embodiment, the polymer composition does not contain any coupling agents. For example, in one embodiment, the polymer composition can be polyisocyanate free. In fact, in one aspect, various advantages and benefits may be realized by not including any polyisocyanate compounds.

The polymer composition of the present disclosure can also optionally contain a stabilizer and/or various other additives. Such additives can include, for example, antioxidants, acid scavengers, UV stabilizers or heat stabilizers. In addition, the polymer composition may contain processing auxiliaries, for example adhesion promoters, or antistatic agents.

For instance, in one embodiment, an ultraviolet light stabilizer may be present. The ultraviolet light stabilizer may comprise a benzophenone, a benzotriazole, or a benzoate. Particular examples of ultraviolet light stabilizers include 2,4-dihydroxy benzophenone, 2-hydroxy-4-methoxybenzophenone, 2-(2'-hydroxy-3',5'-di-t-butylphenyl)benzotriazole, 2-(2'-hydroxy-3'-t-butyl-5'-methylphenyl)-5-chlorobenzotriazole, 2,4-dihydroxybenzophenone, 2-hydroxy-4-methoxybenzophenone, 2-hydroxy-4-octoxybenzophenone, and 5,5'-methylene bis(2-hydroxy-4-methoxybenzophenone); 2-(2H-benzotriazole-2-yl)-4,6-bis(1-methyl-1-phenylethyl) phenol; 2-(2'-hydroxyphenyl)benzotriazoles, e.g., 2-(2'-hydroxy-5'-methylphenyl)benzotriazole, 2-(2'-hydroxy-5'-t-octylphenyl)benzotriazole, 2-(2'-hydroxy-3',5'-di-t-butylphenyl)benzotriazole, 2-(2'-hydroxy-3',5'-di-t-butylphenyl)-5-chlorobenzotriazole, 2-(2'-hydroxy-3'-t-butyl-5'-methylphenyl)-5-chlorobenzotriazole, 2-(2'-hydroxy-3',5'-dicumylphenyl)benzotriazole, and 2,2'-methylene bis(4-t-octyl-6-benzotriazolyl)phenol, phenylsalicylate, resorcinol monobenzoate, 2,4-di-t-butylphenyl-3',5'-di-t-butyl-4'-hydroxybenzoate, and hexadecyl-3,5-di-t-butyl-4-hydroxybenzoate; substituted oxanilides, e.g., 2-ethyl-2'-ethoxyaniline and 2-ethoxy-4'-dodecylaniline; cyanoacrylates, e.g., ethyl-.alpha.-cyano-.beta.,.beta.-diphenylacrylate and methyl-2-cyano-3-methyl-3-(p-methoxyphenyl)acrylate or mixtures thereof. A specific example of an ultraviolet light absorber that may be present is UV 234, which is a high molecular weight ultraviolet light absorber of the hydroxyl phenyl benzotriazole class. The UV light absorber, when present, can be present in the polymer composition in an amount ranging from about 0.1% by weight to about 2% by weight, such as in an amount ranging from about 0.25% by weight to about 1% by weight based on the total weight of the polymer composition.

In one embodiment, the polymer composition may also include a formaldehyde scavenger, such as a nitrogen-containing compound. Mainly, of these are heterocyclic compounds having at least one nitrogen atom as hetero atom which is either adjacent to an amino-substituted carbon atom or to a carbonyl group, for example pyridine, pyrimidine, pyrazine, pyrrolidone, aminopyridine and compounds derived therefrom. Advantageous compounds of this nature are aminopyridine and compounds derived therefrom. Any of the aminopyridines is in principle suitable, for example 2,6-diaminopyridine, substituted and dimeric aminopyridines, and mixtures prepared from these compounds. Other advantageous materials are polyamides and dicyano diamide, urea and its derivatives and also pyrrolidone and compounds derived therefrom. Examples of suitable pyrrolidones are imidazolidinone and compounds derived therefrom, such as hydantoins, derivatives of which are particularly advantageous, and those particularly advantageous among these compounds are allantoin and its derivatives. Other particularly advantageous compounds are triamino-1,3,5-triazine(melamine) and its derivatives, such as melamine-formaldehyde condensates and methylol melamine. Oligomeric polyamides are also suitable in principle for use as formaldehyde scavengers. In one aspect, the formaldehyde scavenger can comprise melamine. In an alternative embodiment, the acid scavenger can be a copolyamide. The copolyamide can be used alone or in combination with a melamine.

Further, the formaldehyde scavenger can be a guanidine compound which can include an aliphatic guanamine-based compound, an alicyclic guanamine-based compound, an aromatic guanamine-based compound, a hetero atom-containing guanamine-based compound, or the like. The formaldehyde scavenger can be present in the polymer composition in an amount ranging from about 0.005% by weight to about 2% by weight, such as in an amount ranging from about 0.0075% by weight to about 1% by weight based on the total weight of the polymer composition.

In one embodiment, however, the polymer composition of the present disclosure can be formulated so as to be free of various formaldehyde scavengers that may, in some embodiments, have an adverse impact on rotationally molded articles made from the composition. For example, in one embodiment, the polymer composition can be formulated to be free of all formaldehyde scavengers, and particularly can be free of nitrogen-containing formaldehyde scavengers. Formaldehyde scavengers that can be excluded from the composition include guanamines, such as benzoguanamine, melamine, and melamine derivatives. In one embodiment, the only formaldehyde scavenger present in the polymer composition may be a copolyamide.

Still another additive that may be present in the composition is a sterically hindered phenol compound, which may serve as an antioxidant. Examples of such compounds, which are available commercially, are pentaerythrityl tetrakis[3-(3,5-di-tert-butyl-4-hydroxyphenyl)propionate](IRGANOX®1010, BASF), triethylene glycol bis[3-(3-tert-butyl-4-hydroxy-5-methylphenyl)propionate] (IRGANOX®245, BASF), 3,3'-bis[3-(3,5-di-tert-butyl-4-hydroxyphenyl)propionohydrazide](IRGANOX® MD 1024, BASF), hexamethylene glycol bis[3-(3,5-di-cert-butyl-4-hydroxyphenyl)propionate](IRGANOX®259, BASF), and 3,5-di-tert-butyl-4-hydroxytoluene (LOWINOX® BHT, Chemtura). The above compounds may be present in the polymer composition in an amount ranging from about 0.01% by weight to about 1% by weight based on the total weight of the polymer composition.

In one embodiment, the polymer composition of the present disclosure contains significant amounts of antioxidant and other stabilizers. For example, the polymer composition can be formulated so as to contain one or more sterically hindered phenol compounds in an amount greater than about 0.2% by weight, such as in an amount greater than about 0.22% by weight, such as in an amount greater than about 0.3% by weight, and generally in an amount less than about 5% by weight, such as in an amount less than about 2% by weight. Including greater amounts of antioxidant can increase the thermal stability of the polymer composition.

Light stabilizers that may be present in addition to the ultraviolet light stabilizer in the composition include sterically hindered amines. Hindered amine light stabilizers that may be used include oligomeric compounds that are N-methylated. In one aspect, the light stabilizer can comprise bis(2,2,6,6-tetramethyl-4-piperidyl)sebacate. For instance, one example of a hindered amine light stabilizer comprises ADK STAB LA-63 light stabilizer available from Adeka Palmarole. The light stabilizers, when present, can be present in the polymer composition in an amount ranging from about 0.1% by weight to about 2% by weight, such as in an amount ranging from about 0.25% by weight to about 1% by weight based on the total weight of the polymer composition.

In addition to the above components, the polymer composition may also contain an acid scavenger. The acid scavenger may comprise, for instance, an alkaline earth metal salt. For instance, the acid scavenger may comprise a calcium salt, such as a calcium citrate. In one aspect, the calcium citrate is a tricalcium citrate. Another acid scavenger well suited for use in the polymer composition is calcium propionate anhydrous. In one embodiment, the acid scavenger selected for use in the polymer composition is a calcium stearate. Calcium stearate has been found to provide various advantages and benefits with respect to properties obtained from molded articles made from the polymer composition. The calcium stearate, for instance, can be calcium 12-hydroxystearate. The acid scavenger may be present in an amount ranging from about 0.01% by weight to about 1% by weight based on the total weight of the polymer composition.

In one embodiment, a lubricant may be present. The lubricant can comprise a polymer wax composition. For example, a fatty acid amide may be used. One example of a fatty acid amide is ethylene bis(stearamide).

Alternatively, the lubricant can comprise a polyethylene wax. Lubricants may generally be present in the polymer composition in an amount from about 0.01% by weight to about 1% by weight.

The polymer composition can also contain a nucleating agent that may increase the crystallinity of the polyoxymethylene polymer. The nucleating agent, for instance, can comprise an oxymethylene terpolymer, talc particles, or the like. Alternatively, the polymer composition can be formulated so as not to contain any nucleating agents. When present, the nucleating agent can be added to the polymer composition in an amount greater than about 0.1% by weight, such as in an amount greater than about 0.2% by weight, and generally in an amount less than about 1.5% by weight, such as in an amount less than about 0.8% by weight.

In one embodiment, one or more coloring agents can also be added to the polymer composition. The coloring agent can be a pigment or a dye. In one aspect, the coloring agent can be added as a masterbatch in combination with a polyoxymethylene polymer. One or more coloring agents can be present in the polymer composition generally in an amount greater than about 0.1% by weight and generally in an amount less than about 2% by weight.

Any of the above additives can be added to the polymer composition alone or combined with other additives. In general, each additive is present in the polymer composition in an amount less than about 5% by weight, such as in an amount ranging from about 0.005% by weight to about 2% by weight, such as in an amount ranging from about 0.0075% by weight to about 1% by weight, such as from about 0.01% by weight to about 0.5% by weight based on the total weight of the polymer composition.

In order to form a powder from the polymer composition of the present disclosure, in one aspect, the components of the polymer composition can be mixed together and then melt blended. For instance, the components can be melt blended in an extruder. Processing temperatures can vary depending upon the type of polyoxymethylene polymer chosen for use in the application. In one embodiment, processing temperatures can be from about 165° C. to about 200° C.

Extruded strands can be produced which are then pelletized. The pelletized compound can then be ground to a suitable particle size and to a suitable particle size distribution to produce a powder that is well suited for use in rotational molding.

For example, any suitable hammermill or granulator may be used to produce the powder composition. In one embodiment, cryogenic grinding is used to produce particles having a relatively small size and a uniform particle size distribution. Cryogenic grinding, for instance, can produce a powder not only having a uniform size but also having particles that are approximately spherical in shape.

Once the polymer composition is formulated and formed into a powder having a controlled particle size distribution, the polymer particles are loaded into a mold for producing molded articles. The polymer particles are particularly well suited for use in rotational molding processes. During rotational molding, the polymer particles are loaded into a mold and the mold is rotated at least about a first axis and a second axis while being heated. The polymer composition is heated to a molten temperature, causing the polymer composition to flow and coat the interior walls of the mold for producing hollow vessels.

Of particular advantage, the polymer composition of the present disclosure containing the polyoxymethylene polymer can be incorporated into a rotational molding application using conventional equipment without modification. For instance, the polymer particles of the present disclosure can be formulated to have a bulk density and flowability characteristics that are well suited for rotational molding. For example, the particles can display a funnel flow when tested according to the A.R.M. Funnel Test (100 grams) of less than about 35 seconds, such as less than about 30 seconds, such as less than about 25 seconds, such as less than about 20 seconds, and generally greater than about 5 seconds. The particles can have an untapped bulk density of greater than about 0.37 g/cc, such as greater than about 0.4 g/cc, such as greater than about 0.42 g/cc, and generally less than about 0.6 g/cc.

When producing rotationally molded articles, no pre-drying of the powder is necessary and the use of nitrogen is not necessary during molding. In addition, the polymer composition of the present disclosure can easily release from the mold after cooling requiring no special coatings or tools. The polymer composition of the present disclosure also shows excellent flow properties even when molding intricate designs.

Rotationally molded articles can be produced according to the present disclosure at relatively fast cycle times. For instance, at oven temperatures of from about 400° F. to about 450° F., a rotationally molded article having a wall thickness of 3.8 mm can be produced in less than about 20 minutes, such as less than about 18 minutes, and generally greater than about 10 minutes, such as greater than about 15 minutes. At a wall thickness of 5.1 mm, articles can be produced in generally less than about 25 minutes, such as less than about 21 minutes, and generally at times greater than about 12 minutes, such as greater than about 18 minutes. Air cooling times are generally less than about 30 minutes. For instance, when rotated in air, the cooling time can be from about 0 to about 10 minutes. When rotated in forced air, the cooling time can be from about 10 minutes to about 20 minutes.

Figure 3:
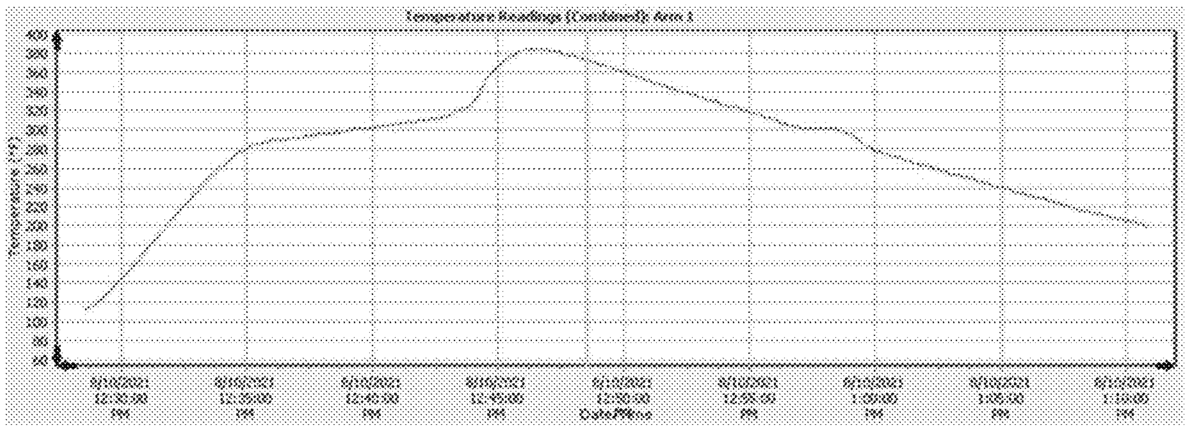
FIG. 3 is a graphical representation of an internal temperature profile during a rotational molding cycle in accordance with the present disclosure.

For exemplary purposes only, FIG. 3 illustrates one embodiment of a temperature cycle for rotationally molding an article in accordance with the present disclosure. Of particular advantage, the temperature profile is very similar to other polymers, including rotationally molding polyethylene polymers or polyamide polymers. Thus, articles can be made in accordance with the present disclosure using a polyoxymethylene polymer with dramatically improved properties at similar temperatures and energy requirements. For example, during rotational molding, articles can be produced with an outer wall temperature of less than about 232° C., such as less than about 228° C., such as less than about 225° C., such as less than about 220° C., and generally greater than about 210° C. The part internal air temperature can generally less than about 220° C., such as less than about 202° C., such as less than about 198° C., such as less than about 193° C., such as less than about 190° C., and generally greater than about 150° C., such as greater than about 170° C. The internal air temperature described above is generally maintained for from about 4 minutes to about 12 minutes. The demold temperature of the part can generally be up to about 93° C., such as from about 70° C. to about 93° C.

Thus, rotationally molded articles can be produced in accordance with the present disclosure being made from a single layer of material having a wall thickness of from about 3.8 mm to about 5.1 mm in a total cycle time (heating and cooling) of less than about 60 minutes, such as less than about 51 minutes, such as less than about 45 minutes, such as less than about 30 minutes, and generally greater than about 15 minutes.

Figure 2:
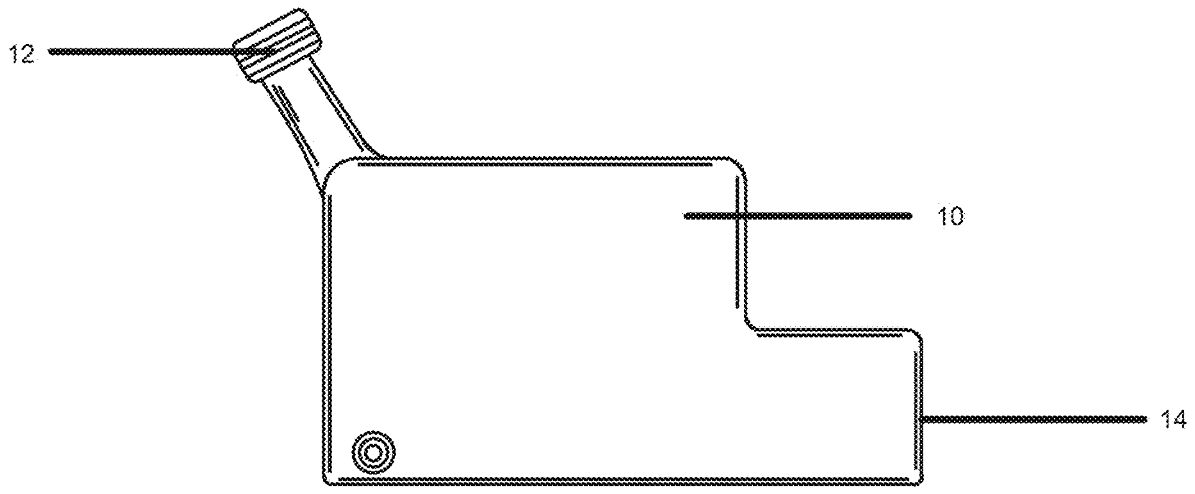
FIG. 2 is a side view of the container illustrated in FIG. 1.

In one embodiment, the polymer composition can be used to produce a container 10 as shown in FIGS. 1 and 2. The container 10 can be, for instance, a fuel tank and/or a tank designed to hold compressed gases. The fuel tank 10 can include a spout 12 for receiving a fluid and can include one or more walls 14.

As shown in FIGS. 1 and 2, the container 10 can be formed without any seams. Thus, the container is seamless which can dramatically improve the strength, especially the impact resistance strength of the container. The wall 14 can generally have a thickness of greater than about 0.5 mm, such as greater than about 1 mm, such as greater than about 2 mm, and generally less than about 10 mm, such as less than about 8 mm, such as less than about 6 mm.

Rotomolded containers made according to the present disclosure can be formed with low voids and therefore with a high density. The density of the polymer layer used to form the container can be greater than about 1250 $kg/m^3$, such as greater than about 1260 $kg/m^3$, such as greater than about 1270 $kg/m^3$, such as greater than about 1280 $kg/m^3$, such as greater than about 1290 $kg/m^3$, such as greater than about 1300 $kg/m^3$, such as greater than about 1310 $kg/m^3$, such as greater than about 1350 $kg/m^3$, and generally less than about 1450 $kg/m^3$, when containing an impact modifier.

All different types of containers can be made in accordance with the present disclosure. The containers can include fuel tanks, hydraulic tanks, water tanks, compressed gas tanks, thermo-coolers, hydraulic oil tanks, diesel exhaust fluid tanks, and the like. In one embodiment, the container can have a relatively small volume. For instance, the container can have a volume of less than about 10 gallons, such as less than about 5 gallons, such as less than about 4 gallons, such as less than about 2 gallons, and generally greater than about 0.1 gallons. Alternatively, larger tanks can be produced. For instance, the tank can have a volume of greater than about 10 gallons, such as greater than about 15 gallons, such as greater than about 20 gallons, and generally less than about 100 gallons, such as less than about 50 gallons, such as less than about 30 gallons. In one embodiment, a fuel tank for a sea vessel or boat can be constructed having a volume of from about 15 gallons to about 35 gallons.

Containers made according to the present disclosure can have excellent permeability characteristics in combination with excellent impact resistance. The permeability of the container or of the container wall can be tested according to SAE Test J2665 (latest version as of 2021). The SAE Test J2665 tests the permeability of the material with a test fuel comprising 10% ethanol, 45% toluene, and 45% iso-octane. Determination of the steady state flux is reported in gmm/$m^2$ per day and is carried out per SAE Test J2665, Section 10. Containers made according to the present disclosure can have a normalized (for thickness) permeation of less than about 3.5 g-mm/$m^2$ per day at 40° C., such as less than about 3 g-mm/$m^2$ per day, such as less than about 2.8 g-mm/$m^2$ per day at 40° C.

The wall can also be tested according to Test Method US EPA 40 CFR Part 1060.520 and can display a permeation of less than about 1.1 g/$m^2$/day, such as less than about 0.9 g/$m^2$/day, such as less than about 0.7 g/$m^2$/day (and generally greater than about 0.01 g/$m^2$/day). In addition, even when made from a single layer of material, the wall can display a stabilization parameter of greater than about 0.95, such as greater than about 0.97, such as greater than about 0.98 ($r^2$). The above result can be obtained after a soak duration of ten weeks and at a test temperature of 28° C.

The polymer composition can also display a Charpy notched impact strength at 23° C. of greater than about 9 kJ/$m^2$, such as greater than about 10 kJ/$m^2$, such as greater than about 12 kJ/$m^2$, such as greater than about 14 kJ/$m^2$, such as greater than about 16 kJ/$m^2$, such as greater than about 18 kJ/$m^2$, and generally less than about 50 kJ/$m^2$. Charpy notched impact strength can be measured according to ISO Test 179 using an injection molded specimen.

Containers made according to the present disclosure can also be tested for multiaxial impact strength according to ARM low temperature impact test (V4) at 23° C. (t=3 mm). The multiaxial impact strength can be greater than about 5 ft-lbs, such as greater than about 7.5 ft-lbs, such as greater than about 9 ft-lbs, such as greater than about 10 ft-lbs, such as greater than about 12 ft-lbs, such as greater than about 14 ft-lbs, and generally less than about 30 ft-lbs.

For example, articles made according to the present disclosure can generally have a relatively high density. In one aspect, articles made from the powder composition of the present disclosure can have a density of greater than about 1.2 g/$cm^3$, such as greater than about 1.25 g/$cm^3$, such as greater than about 1.3 g/$cm^3$. The density is generally less than about 2 g/$cm^3$, such as less than about 1.6 g/$cm^3$.

The present disclosure may be better understood with reference to the following examples.

Example No. 1

Various polymer formulations were formulated and tested for various properties in order to demonstrate that powder compositions made from the formulations are well suited for rotational molding applications.

More particularly, the following table includes the polymer compositions that were formulated.

| | Weight % Sample No. | | | | | | |
|---|---|---|---|---|---|---|---|
| Material | 1 | 2 | 3 | 4 | 5 | 6 | 7 |
| Polyoxymethylene polymer (2.5 g/10 min-low amount of hydroxyl groups) | 77.238% | 76.738% | | 74.238% | 74.738% | 74.238% | 100.000% |
| Polyoxymethylene polymer (2.3 g/10 min-high amount of hydroxyl groups) | | | 76.238% | | | | |
| Thermoplastic polyurethane | 18% | 18% | 18% | 10% | 10% | 10% | |
| Thermoplastic ester ether elastomer | | | | 10% | | | |
| Thermoplastic elastomer of a block copolymer of polybutylene terephthalate and polyether segments | | | | | 10% | 10% | |
| Polyoxymethylene resin | 3.502% | 3.502% | 3.502% | 3.502% | 3.502% | 3.502% | 3.502% |
| Polyoxymethylene glycol | 0.50% | 0.50% | 0.50% | 0.50% | 0.50% | 0.50% | 0.50% |
| Benzotriazole UV stabilizer | 0.30% | 0.30% | 0.30% | 0.30% | 0.30% | 0.30% | 0.30% |
| Hindered amine light stabilizer | 0.30% | 0.30% | 0.30% | 0.30% | 0.30% | 0.30% | 0.30% |
| Calcium propionate anhydrous | 0.10% | 0.10% | 0.10% | 0.10% | 0.10% | 0.10% | 0.10% |
| Hindered phenolic antioxidant | 0.03% | 0.23% | 0.23% | 0.23% | 0.23% | 0.23% | 0.23% |
| Melamine | 0.03% | 0.03% | 0.03% | 0.03% | 0.03% | 0.03% | 0.03% |
| Ethylene bis(stearamide) | | 0.20% | 0.20% | 0.20% | 0.20% | 0.20% | 0.20% |

-continued

| Material | Weight % Sample No. 1 | 2 | 3 | 4 | 5 | 6 | 7 |
|---|---|---|---|---|---|---|---|
| Copolyamide | | 0.05% | 0.05% | 0.05% | 0.05% | 0.05% | 0.05% |
| Tricalcium citrate | | 0.05% | 0.05% | 0.05% | 0.05% | 0.05% | 0.05% |
| Oxymethylene terpolymer nucleating agent | | | | 0.50% | | 0.50% | |
| MDI | | | 0.50% | | | | |
| Carbon Black | | | | | | | |
| MBS core and shell impact modifier (Type I) | | | | | | | |
| MBS core and shell impact modifier (Type II) | | | | | | | 18% |

| Material | Weight % Sample No. 8 | 9 | 10 | 11 | 12 | 13 |
|---|---|---|---|---|---|---|
| Polyoxymethylene polymer (2.5 g/10 min-low amount of hydroxyl groups) | 82.738% | 73.038% | 61.700% | 78.238% | 78.238% | 76.738% |
| Polyoxymethylene polymer (2.3 g/10 min-high amount of hydroxyl groups) | | | | | | |
| Thermoplastic polyurethane | | 10% | 10% | 8% | 0% | |
| Thermoplastic ester ether elastomer | | | | | | |
| Thermoplastic elastomer of a block copolymer of polybutylene terephthalate and polyether segments | | 10% | 10% | 8% | 16% | |
| Polyoxymethylene resin | 3.502% | 4.452% | 13.423% | 3.502% | 3.502% | 3.502% |
| Polyoxymethylene glycol | 0.50% | 0.50% | 0.75% | 0.50% | 0.50% | 0.50% |
| Benzotriazole UV stabilizer | 0.30% | 0.30% | 0.45% | 0.30% | 0.30% | 0.30% |
| Hindered amine light stabilizer | 0.30% | 0.30% | 0.45% | 0.30% | 0.30% | 0.30% |
| Calcium propionate anhydrous | 0.10% | 0.10% | 0.15% | 0.10% | 0.10% | 0.10% |
| Hindered phenolic antioxidant | 0.23% | 0.23% | 0.24% | 0.23% | 0.23% | 0.23% |
| Melamine | 0.03% | 0.03% | 0.04% | 0.03% | 0.03% | 0.03% |
| Ethylene bis(stearamide) | 0.20% | 0.20% | 0.20% | 0.20% | 0.20% | 0.20% |
| Copolyamide | 0.05% | 0.05% | 0.05% | 0.05% | 0.05% | 0.05% |
| Tricalcium citrate | 0.05% | 0.05% | 0.05% | 0.05% | 0.05% | 0.05% |
| Oxymethylene terpolymer nucleating agent | | 0.50% | 0.50% | 0.50% | 0.50% | |
| MDI | | | | | | |
| Carbon Black | | 0.25% | 2.00% | | | |
| MBS core and shell impact modifier (Type I) | 25% | | | | | |
| MBS core and shell impact modifier (Type II) | | | | | | 12% |

The above compositions were tested for various physical properties and the following results were obtained.

| Process | Property | Test Method | Control | Sample No. 1 | Sample No. 2 | Sample No. 3 | Sample No. 4 | Sample No. 5 | Sample No. 6 | Sample No. 7 |
|---|---|---|---|---|---|---|---|---|---|---|
| Injection Molding | Density (kg/m^3) | ISO 1183 | 1410 | 1350 | 1350 | 1354 | 1345 | 1338 | 1335 | 1289 |
| | Tensile Stress at break, 50 mm/min (MPa) | ISO 527 | 46 | 28 | 32 | 31 | 31 | 31 | 31 | 35 |
| | Tensile Strain at break, 50 mm/min (%) | ISO 527 | >50 | >50 | >50 | >50 | >50 | >50 | >50 | >200 |
| | Flexural Modulus, 23° C. (MPa) | ISO 178 | 2238 | 1310 | 1350 | 1507 | 1567 | 1421 | 1453 | 1479 |
| | Charpy Notched Impact strength, 23° C. (kJ/m^2) | ISO 179 | 10.2 | 16.5 | 14.8 | 17.5 | 13.0 | 16.6 | 15.7 | 20.2 |
| | Charpy Notched Impact strength, -40° C. (kJ/m^2) | ISO 179 | 8.2 | 8.8 | 8.4 | 7.7 | 9.2 | 8.1 | 9.5 | 9.4 |
| | DTUL @ 1.82 MPa (° C.) | ASTM D648 | 88 | 65 | 68 | 65 | 72 | 64 | 73.8 | 65.5 |
| | DTUL @ 0.455 MPa (° C.) | ASTM D648 | 148 | 122 | 121 | 128 | 127 | 123 | 133.6 | — |
| | Multiaxial Impact Strength Total Energy, 23° C. (J) | ASTM D3763 | 3 | 34 | 24 | 40 | 33 | 37 | 35 | 34 |
| | Multiaxial Impact Strength Total Energy, −40° C. (J) | ASTM D3763 | 1.3 | 1.8 | 2.3 | 3.9 | 8.2 | 9.4 | 13 | 6 |
| Roto-molding | Density (kg/m^3) | ISO 1183 | 1380 | 1310 | 1303 | 1300 | 1327 | 1303 | 1275 | — |
| | Multiaxial impact @ 23° C. Mean Failure Energy (ft-lbs), t = 3 mm | ARM Low Temperature Impact Test (V4) | 2.5-5.0 | 7.5-10.0 | 7.5-10.0 | 12.5-15 | 12.5-17.5 | 7.5-10.0 | 15-17.5 | — |
| | Multiaxial impact @ 0° C. Mean Failure Energy (ft-lbs), t = 3 mm | ARM Low Temperature Impact Test (V4) | 2.5-5.0 | 2.5-5.0 | 2.5-5.0 | 5.0-10.0 | 10.0-15.0 | 7.5-10.0 | 12.5-15 | — |
| | Multiaxial impact @ −20° C. Mean Failure Energy (ft-lbs), t = 6 mm | — | — | — | — | — | — | — | 7.5-10 | — |
| | Multiaxial impact @ −40° C. Mean Failure Energy (ft-lbs), t = 6 mm | — | — | — | — | — | — | — | 7.5-10 | — |
| | shrink 3 mm (%) | internal Celanese Method | — | — | 0.25-1.5 | | — | — | — | — |
| | shrink 6 mm (%) | internal Celanese Method | — | — | 1.0-2.5 | | — | — | — | — |
| | Fuel Permeation 28° C./3 mm, (g/day-m^2) | CARB-LEVIII, SAE J2665 | — | — | 0.22 | — | — | — | — | — |
| | Fuel Permeation 40° C./3 mm, g/day-m^2) | CARB-LEVIII, SAE J2665 | — | — | 0.99 | — | — | — | — | — |
| Pellets | melt flow index (g/10 min) | ISO 1133, 190° C./2.16 kg | 2.5 | 3.4 | 3.1 | 1.9 | 2.9 | 2.3 | 2.1 | 0.9 |
| | Melt Point (° C.) | ISO 11357 | 165 | 165 | 165 | 166 | 166 | 166 | 167 | 167 |
| | Kd (wt %/min) @ 230° C., 100 gm | LA3-1450 | — | 0.014 | 0.016 | 0.012 | 0.008 | 0.009 | 0.016 | 0.054 |
| Powder screened to 35 mesh | Funnel Flow (sec) | A.R.M. Funnel, 100 g | 17.7 | 20.7 | 18.6 | 20.2 | 30.3 | 24.3 | 32.62 | — |
| | untapped bulk density | g/cc | 0.469 | 0.440 | 0.450 | 0.465 | 0.413 | 0.401 | 0.389 | — |
| | particle size distribution | Light Scatter Size Analyzer | — | <10% @ 211.7 μm, <25% @ 301.0 μm, <50% @ 419.6 μm, <75% @ 580.2 μm, | <10% @ 141.9 μm, <25% @ 206.7 μm, <50% @ 317.0 μm, <75% @ 481.2 μm, | — | <10% @ 137.7 μm, <25% @ 201.9 μm, <50% @ 309.2 μm, <75% @ 464.8 μm, | <10% @ 135.3 μm, <25% @ 198.1 μm, <50% @ 301.5 μm, <75% @ 450.1 μm, | — | — |

-continued

| Process | Property | Test Method | Control | Sample No. 1 | Sample No. 2 | Sample No. 3 | Sample No. 4 | Sample No. 5 | Sample No. 6 | Sample No. 7 |
|---|---|---|---|---|---|---|---|---|---|---|
| | | | | <90% @ 782.7 µm | <90% @ 699.7 µm | | <90% @ 671.9 µm | <90% @ 643.1 µm | | |
| | Kd (wt %/min) @ 230° C., 100 gm | LA3-1450 | — | 0.064 | — | — | — | — | — | — |

*Control - polyoxymethylene without impact modifiers

| Process | Property | Test Method | Control | Sample No. 8 | Sample No. 9 | Sample No. 10 | Sample No. 11 | Sample No. 12 | Sample No. 13 |
|---|---|---|---|---|---|---|---|---|---|
| Injection Molding | Density (kg/m^3) | ISO 1183 | 1410 | 1253 | 1334 | 1337 | 1350 | 1342 | 1324 |
| | Tensile Stress at break, 50 mm/min (MPa) | ISO 527 | 46 | 34 | 31 | 31 | 34 | 34 | 38 |
| | Tensile Strain at break, 50 mm/min (%) | ISO 527 | >50 | >200 | >50 | >50 | >50 | >50 | >100 |
| | Flexural Modulus, 23° C. (MPa) | ISO 178 | 2238 | 1507 | 1442 | 1398 | 1603 | 1653 | 1787 |
| | Charpy Notched Impact strength, 23° C. (kJ/m^2) | ISO 179 | 10.2 | 23.6 | 14.7 | 12.2 | 13.4 | 13.6 | 14.6 |
| | Charpy Notched Impact strength, -40° C. (kJ/m^2) | ISO 179 | 8.2 | 20.1 | 8.8 | 7.3 | 9.2 | 10.3 | 8.7 |
| | DTUL @ 1.82 MPa (° C.) | ASTM D648 | 88 | 66 | 68.5 | 68.1 | 73.8 | 73.2 | 77.1 |
| | DTUL @ 0.455 MPa (° C.) | ASTM D648 | 148 | 112 | 132.1 | 128.4 | 135.1 | 135 | — |
| | Multiaxial Impact Strength Total Energy, 23° C. (J) | ASTM D3763 | 3 | — | 35 | 35 | 30 | 34 | 30 |
| | Multiaxial Impact Strength Total Energy, −40° C. (J) | ASTM D3763 | 1.3 | — | 5 | 1 | 6 | 17 | 8 |
| Roto-molding | Density (kg/m^3) | ISO 1183 | 1380 | — | — | — | 1295 | 1312 | — |
| | Multiaxial impact @ 23° C. Mean Failure Energy (ft-lbs), t = 3 mm | ARM Low Temperature Impact Test (V4) | 2.5-5.0 | — | — | — | — | — | — |
| | Multiaxial impact @ 0° C. Mean Failure Energy (ft-lbs), t = 3 mm | ARM Low Temperature Impact Test (V4) | 2.5-5.0 | — | — | — | — | — | — |
| | Multiaxial impact @ −20° C. Mean Failure Energy (ft-lbs), t = 6 mm | — | — | — | — | — | — | — | — |
| | Multiaxial impact @ −40° C. Mean Failure Energy (ft-lbs), t = 6 mm | — | — | — | — | — | — | — | — |
| | shrink 3 mm (%) | internal Celanese Method | — | — | — | — | — | — | — |
| | shrink 6 mm (%) | internal Celanese Method | — | — | — | — | — | — | — |
| | Fuel Permeation 28° C./3 mm, (g/day-m^2) | CARB-LEVIII, SAE J2665 | — | — | — | — | — | — | — |
| | Fuel Permeation 40° C./3 mm, g/day-m^2) | CARB-LEVIII, SAE J2665 | — | — | — | — | — | — | — |
| Pellets | melt flow index (g/10 min) | ISO 1133, 190° C./2.16 kg | 2.5 | 0.4 | 2.1 | 2.4 | 2.3 | 1.9 | 1.3 |
| | Melt Point (° C.) | ISO 11357 | 165 | 167 | 167 | 168 | 167 | 167 | 167 |
| | Kd (wt %/min) @ 230° C., 100 gm | LA3-1450 | — | 0.198 | 0.018 | 0.009 | 0.016 | 0.010 | 0.016 |
| Powder screened to 35 mesh | Funnel Flow (sec) | A.R.M. Funnel, 100 g | 17.7 | 20.2 | — | — | 22.32 | 26.13 | 21.12 |
| | untapped bulk density | g/cc | 0.469 | 0.423 | — | — | 0.434 | 0.406 | 0.442 |
| | particle size distribution | Light Scatter Size Analyzer | — | — | — | — | — | — | — |

-continued

| Process | Property | Test Method | Control | Sample No. 8 | Sample No. 9 | Sample No. 10 | Sample No. 11 | Sample No. 12 | Sample No. 13 |
|---|---|---|---|---|---|---|---|---|---|
| | Kd (wt %/min) @ 230° C., 100 gm | LA3-1450 | — | — | — | — | — | — | — |

*Control - polyoxymethylene without impact modifiers

Example No. 2

The polymer formulation designated as Sample No. 2 in Example No. 1 above was used to produce a rotationally molded container or tank. The molded tank had a nominal capacity of 4.15 liters and had an internal surface area of 0.103 $m^2$ and had a volume to surface area ratio of 40.29 $l/m^2$. The tank was made from a single layer of the polymer composition.

The tank was then tested according to US EPA 40 CFR Part 1060.520 for permeation and stabilization. The tank was tested having a soak duration of ten weeks and at a test temperature of 28° C. The tank displayed a permeation rate of only 0.6 $g/m^2$/day. The tank significantly outperformed the EPA requirement of 1.5 $g/m^2$/day. Unexpectedly, the tank also displayed a stabilization parameter of 0.99, even though the tank was made from a single layer of material.

The tank was also tested for fuel permeation according to the California Air Resources Board Test TP-901. The tank displayed a permeation rate of only 1.132 $g/m^2$/day based on the internal surface area of the fuel tank.

The rotationally molded tank also passed the ABYC Flammability and Shock Tests.

The tank material was also tested according to Test Procedure SAE J1960 (2008) for resistance to UV light. The material was subjected to continuous UV exposure using a weatherometer in a manner that amounted to a 5-year exposure (DE<2). The material was given an exposure of 1250 $kJ/m^2$. The material passed the test.

Example No. 3

Different polymer formulations were formulated and tested for various mechanical properties in order to demonstrate that polymer compositions of the present disclosure can be varied for controlling mechanical properties in a desired way.

The following polymer compositions were created:

| Material | Weight % Sample No. 14 | 15 | 16 | 17 | 18 |
|---|---|---|---|---|---|
| Polyoxymethylene polymer (9.3 g/10 min-high amount of hydroxyl groups->20 mmol/kg) | 81.15 | 90.15 | 94.15 | | 60.85 |
| Polyoxymethylene polymer (2.3 g/10 min-high amount of hydroxyl groups - >20 mmol/kg) | | | | 68.70 | |
| Thermoplastic polyurethane | 18 | 9 | 5 | 30 | 38 |
| Hindered phenolic antioxidant | 0.2 | 0.2 | 0.2 | 0.35 | 0.2 |
| Ethylene bis(stearamide) | 0.15 | 0.15 | 0.15 | 0.15 | 0.15 |
| MDI | 0.5 | 0.5 | 0.5 | 0.8 | 0.8 |

The above formulations were tested for mechanical properties and the following results were obtained:

| | | Sample No. 14 | 15 | 16 | 17 | 18 |
|---|---|---|---|---|---|---|
| Tensile Modulus | MPa | 2300 | 2000 | 1650 | 1200 | 950 |
| Tensile Strength @yield | MPa | 58 | 52 | 43 | 35 | 30 |
| Tensile Strain @yield | % | 10 | 12 | 16 | 25 | 30 |
| Charpy Notched Impact @23° C. | $kJ/m^2$ | 10 | 13 | 21 | 100 | 100 |

As shown above, changing the relative amount of the components can have an impact on the resulting properties.

Example No. 4

Different polymer formulations were formulated and tested for various mechanical properties. More particularly, the following table includes the polymer compositions that were formulated.

| Material | Weight % Sample No. 19 | 20 | 21 | 22 | 23 | 24 | 25 |
|---|---|---|---|---|---|---|---|
| Polyoxymethylene polymer (2.5 g/10 min-low amount of hydroxyl groups) | 73.038% | 73.038% | 74.188% | 72.938% | 72.838% | 72.988% | 72.988% |
| Thermoplastic polyurethane elastomer | 10% | 10% | 10% | 10% | 10% | 10% | 10% |
| Thermoplastic elastomer of a block | | | 10% | | | | |

-continued

| | | | | | | | |
|---|---|---|---|---|---|---|---|
| copolymer of polybutylene terephthalate and polyether segments (MP - 185 C.; MFR - 20 g/10 min at 220 C.; 27 Shore D) | | | | | | | |
| Thermoplastic elastomer of a block copolymer of polybutylene terephthalate and polyether segments (MP - 167 C.; MFR - 15 g/10 min at 190 C.; 25 Shore D) | 10% | | | 10% | 10% | 10% | 10% |
| Thermoplastic elastomer of a block copolymer of polybutylene terephthalate and polyether segments (MP - 151 C.; MFR - 18 g/10 min at 220 C.) | | 10% | | | | | |
| Polyoxymethylene resin | 4.452% | 4.452% | 3.502% | 4.452% | 4.452% | 4.452% | 4.452% |
| Polyoxymethylene glycol | 0.50% | 0.50% | 0.50% | 0.50% | 0.50% | 0.50% | 0.50% |
| Benzotriazole UV stabilizer | 0.30% | 0.30% | 0.30% | 0.30% | 0.30% | 0.30% | 0.30% |
| Hindered amine light stabilizer | 0.30% | 0.30% | 0.30% | 0.30% | 0.30% | 0.30% | 0.30% |
| Calcium propionate anhydrous | 0.10% | 0.10% | 0.10% | 0.10% | 0.10% | 0.10% | 0.10% |
| Hindered phenolic antioxidant | 0.23% | 0.23% | 0.23% | 0.23% | 0.23% | 0.23% | 0.23% |
| Melamine | 0.03% | 0.03% | 0.03% | 0.03% | 0.03% | 0.03% | 0.03% |
| Ethylene bis(stearamide) | 0.20% | 0.20% | 0.20% | 0.20% | 0.20% | 0.20% | 0.20% |
| Copolyamide | 0.05% | 0.05% | 0.05% | 0.05% | 0.05% | 0.05% | 0.05% |
| Tricalcium citrate | 0.05% | 0.05% | | 0.05% | 0.05% | | |
| Oxymethylene terpolymer nucleating agent | 0.50% | 0.50% | 0.50% | 0.50% | 0.50% | 0.50% | 0.50% |
| CA 12 hydroxy stearate | | | 0.10% | | | 0.10% | 0.10% |
| Carbon Black | 0.25% | 0.25% | | 0.25% | 0.25% | 0.25% | 0.25% |

| | Sample No. | |
|---|---|---|
| Material | 26 (wt %) | 27 (wt %) |
| Polyoxymethylene polymer (2.5 g/10 min-low amount of hydroxyl groups) | 72.878% | |
| Polyoxymethylene polymer (2.5 g/10 min-stabilized) | | 72.888% |
| Thermoplastic polyurethane | 10% | 10% |
| Thermoplastic elastomer of a block copolymer of polybutylene terephthalate and polyether segments (MP - 167 C.; MFR - 15 g/10 min at 190 C.; 25 Shore D) | 10% | 10% |
| Polyoxymethylene resin | 4.452% | 4.452% |
| Polyoxymethylene glycol | 0.50% | 0.50% |
| Benzotriazole UV stabilizer | 0.30% | 0.30% |
| Hindered amine light stabilizer | 0.30% | 0.30% |

-continued

| | | |
|---|---|---|
| Calcium propionate anhydrous | 0.10% | 0.10% |
| Hindered phenolic antioxidant | 0.23% | 0.23% |
| Melamine | 0.03% | 0.03% |
| Ethylene bis(stearamide) | 0.20% | 0.20% |
| Copolyamide | 0.05% | 0.05% |
| CA 12 hydroxy stearate | 0.01% | 0.10% |
| Oxymethylene terpolymer nucleating agent | 0.50% | 0.50% |
| 4,4'-bis(phenylisopropyl) diphenylamine (aromatic amine antioxidant) | 0.20% | 0.10% |
| Carbon Black | 0.25% | 0.25% |

Sample Nos. 19, 20, and 21 were tested for various physical properties and the following results were obtained.

| Process | Property | Test Method | Sample No. 19 | Sample No. 20 | Sample No. 21 |
|---|---|---|---|---|---|
| Injection Molding | Density (kg/m^3) | ISO 1183 | 1336 | 1341 | 1340 |
| | Tensile Stress at break, 50 mm/min (MPa) | ISO 527 | 32 | 32 | 31 |
| | Tensile Strain at break, 50 mm/min (%) | ISO 527 | >50 | >100 | >50 |
| | Flexural Modulus, 23 °C (MPa) | ISO 178 | 1389 | 1396 | 1374 |
| | Charpy Notched Impact strength, 23 °C (kJ/m^2) | ISO 179 | 12 | 11.1 | 14.0 |
| | Charpy Notched Impact strength, −40 °C (kJ/m^2) | ISO 179 | 6.1 | 6.4 | 7.9 |
| | DTUL @ 1.82 MPa (°C) | ASTM D648 | 70.6 | 66 | 69.4 |
| | DTUL @ 0.455 MPa (°C) | ASTM D648 | 123.3 | 120.3 | 123.4 |
| | Multiaxial Impact Strength Total Energy, 23 °C (J) | ASTM D3763 | 36 | 28 | 31 |
| | Multiaxial Impact Strength Total Energy, −40 °C (J) | ASTM D3763 | 4 | 4 | 9 |
| Roto-molding | Density (kg/m^3) | ISO 1183 | 1302 | 1308 | 1283 |
| | Multiaxial impact @ 23 °C Mean Failure Energy (ft-lbs), t = 3 mm | ARM Low Temperature Impact Test (V4) | — | — | — |
| | Multiaxial impact @ 0 °C Mean Failure Energy (ft-lbs), t = 3 mm | ARM Low Temperature Impact Test (V4) | — | — | — |
| | Multiaxial impact @ −20 °C Mean Failure Energy (ft-lbs), t = 6 mm | — | — | — | — |
| | Multiaxial impact @ −40 °C Mean Failure Energy (ft-lbs), t = 6 mm | — | — | — | — |
| | shrink 3 mm (%) | internal Celanese Method | — | — | — |
| | shrink 6 mm (%) | internal Celanese Method | — | — | — |
| | Fuel Permeation 28 °C/3 mm, (g/day-m^2) | CARB-LEVIII, SAE J2665 | — | — | — |

-continued

| Process | Property | Test Method | Sample No. 19 | Sample No. 20 | Sample No. 21 |
|---|---|---|---|---|---|
| | Fuel Permeation 40 °C/3 mm, g/day-m^2) | CARB-LEVIII, SAE J2665 | — | — | — |
| Pellets | melt flow index (g/10 min) | ISO 1133, 190 °C/2.16 kg | 3 | 2.9 | 2.3 |
| | Melt Point (°C) | ISO 11357 | 168 | 168 | 167 |
| | Kd (wt %/min) @ 230 °C, 100 gm | LA3-1450 | 0.011 | 0.08 | 0.011 |

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only and is not intended to limit the invention so further described in such appended claims.

What is claimed:

1. A container for fuels comprising:

a seamless rotational molded housing defining an opening configured to receive a fluid, the housing including an interior enclosure surrounded by a wall and wherein the wall is made from a polymer composition comprising:

a) a polyoxymethylene polymer having a melt flow rate of less than 4 g/10 min, wherein the polyoxymethylene polymer contains hydroxyl groups, the hydroxyl groups being present in an amount less than 10 mmol/kg;

b) one or more impact modifiers being present in the polymer composition in an amount of from 4% by weight to 27% by weight, an impact modifier of the one or more impact modifiers having a melting temperature within 5° C. of a melting temperature of the polyoxymethylene polymer, the one or more impact modifiers comprising a thermoplastic copolyester elastomer, the thermoplastic copolyester elastomer comprising a block copolymer of polybutylene terephthalate and polyether segments;

c) a polyalkylene glycol, the polyalkylene glycol being present in the polymer composition in an amount from 0.1 wt. % to 1 wt. %; and d) an ultraviolet light absorber, the ultraviolet light absorber being present in the polymer composition in an amount from 0.25 wt. % to 1 wt. %;

wherein the wall of the housing has a normalized permeation of less than 4 g-mm/$m^2$ per day at 40° C. according to SAE Test J2665.

2. The container as defined in claim 1, wherein the polyoxymethylene polymer has a melt flow rate of less than 4 g/10 min and greater than 0.5 g/10 min.

3. The container as defined in claim 1, wherein the one or more impact modifiers further comprises a thermoplastic polyurethane elastomer.

4. The container as defined in claim 1, wherein the wall of the container has a normalized permeation of less than 3.5 g-mm/$m^2$ per day at 40° C.

5. The container as defined in claim 1, wherein the container has a multiaxial impact of greater than 7.5 ftlb-f at 23° C.

6. The container as defined in claim 1, wherein the wall has a thickness of from 0.5 mm to 10 mm.

7. The container as defined in claim 1, wherein the wall of the housing has a permeation of less than 1 g/$m^2$/day when tested according to US EPA Test 40 CFR Part 1060.520.

8. The container as defined in claim 1, wherein the wall of the housing displays a stabilization parameter of greater than 0.96 when tested according to US EPA Test 40 CFR Part 1060.520 when tested at 28° C. and for a soak duration of ten weeks.

9. The container as defined in claim 1, wherein the container comprises a fuel tank, a hydraulic oil tank, a compressed gas tank, a water tank, or a diesel exhaust fluid tank.

10. The container as defined in claim 1, wherein the polymer composition is free of any nitrogen-containing formaldehyde scavengers.

11. The polymer composition as defined in claim 1, wherein the polymer composition comprises a nucleating agent in an amount from 0.1 wt. % to 1.5 wt. %.

12. The polymer composition as defined in claim 1, wherein the melting temperature of the impact modifier is less than the melting temperature of the polyoxymethylene polymer.

13. The polymer composition as defined in claim 12, wherein:

the polyalkylene glycol has a molecular weight from 2000 g/mol to 8,000 g/mol;

the polymer composition further comprises an acid scavenger in an amount from 0.01 wt. % to 1 wt. %; and the polyoxymethylene polymer is present in the polymer composition in an amount from 60 wt. % to 80 wt. %.

* * * * *